US007050979B2

(12) United States Patent
Mizutani et al.

(10) Patent No.: US 7,050,979 B2
(45) Date of Patent: May 23, 2006

(54) APPARATUS AND METHOD FOR CONVERTING A SPOKEN LANGUAGE TO A SECOND LANGUAGE

(75) Inventors: Kenji Mizutani, Ikoma (JP); Yoshifumi Hirose, Kashihara (JP); Hidetsugu Maekawa, Ikoma (JP); Yumi Wakita, Nara (JP); Shinichi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 639 days.

(21) Appl. No.: 10/056,424

(22) Filed: Jan. 24, 2002

(65) Prior Publication Data

US 2002/0120436 A1    Aug. 29, 2002

(30) Foreign Application Priority Data

Jan. 24, 2001   (JP)   ............................. 2001-015383

(51) Int. Cl.
G10L 11/00   (2006.01)
G10L 15/00   (2006.01)
G06F 17/28   (2006.01)
G06F 3/00    (2006.01)

(52) U.S. Cl. .................. 704/277; 704/231; 704/2; 704/3; 715/727

(58) Field of Classification Search .............. 704/3, 704/277, 1; 382/185
See application file for complete search history.

(56) References Cited

U.S. PATENT DOCUMENTS 4,774,666 A * 9/1988 Miyao et al. ................. 704/2
4,787,038 A * 11/1988 Doi et al. ..................... 704/2
5,005,127 A * 4/1991 Kugimiya et al. ............ 704/5
5,222,160 A * 6/1993 Sakai et al. ................ 382/185
5,822,720 A * 10/1998 Bookman et al. ............ 704/3
6,154,720 A * 11/2000 Onishi et al. ................. 704/2
6,282,507 B1 * 8/2001 Horiguchi et al. ............ 704/3
6,330,529 B1 * 12/2001 Ito ............................... 704/3
6,917,920 B1 * 7/2005 Koizumi et al. ............ 704/277

FOREIGN PATENT DOCUMENTS

| JP | 2000-066494 | 3/2000 |
| JP | 2000-200275 | 7/2000 |
| WO | WO 99/63456 | 12/1999 |

OTHER PUBLICATIONS

Chinese Office Action for 02106838.0, dated Oct. 28, 2005 with English Translation.

* cited by examiner

*Primary Examiner*—Wayne Young
*Assistant Examiner*—Brian L. Albertalli
(74) *Attorney, Agent, or Firm*—RatnerPrestia

(57) ABSTRACT

A speech interpreting device. Speech is input in a first language. The input speech is recognized. One or more word strings of the first language are extracted and displayed. The word strings correspond to a result of the speech recognition. A word string is selected from the displayed word strings. The selected word string is expected to become an object of conversation to a second language. When a whole or a part of the selected word string is specified, candidates of a term which corresponds to contents of the specified whole or part of the selected word string are extracted and displayed. One of the displayed candidates is selected. The selected word string is converted to a second language.

7 Claims, 25 Drawing Sheets

Fig. 9 (c)
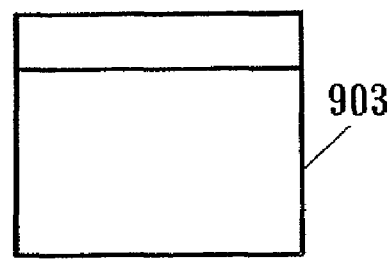
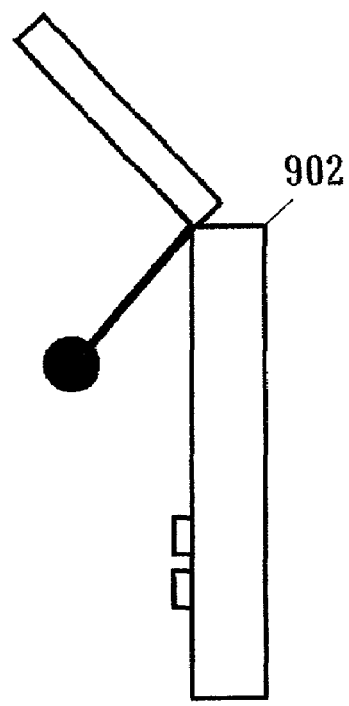
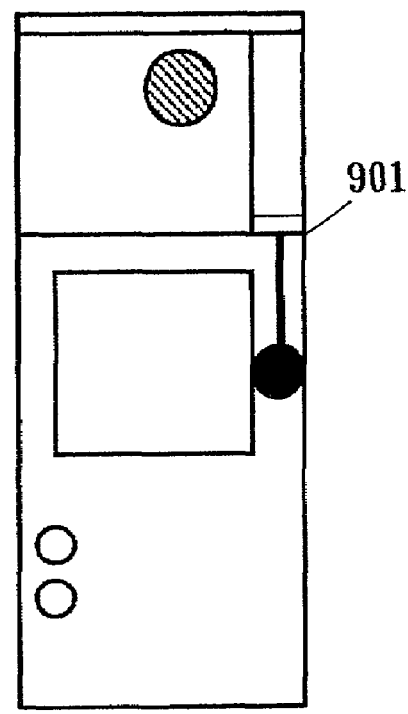
Fig. 9 (b)  Fig. 9 (a)

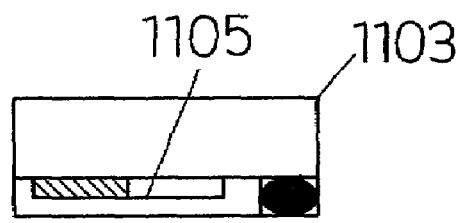
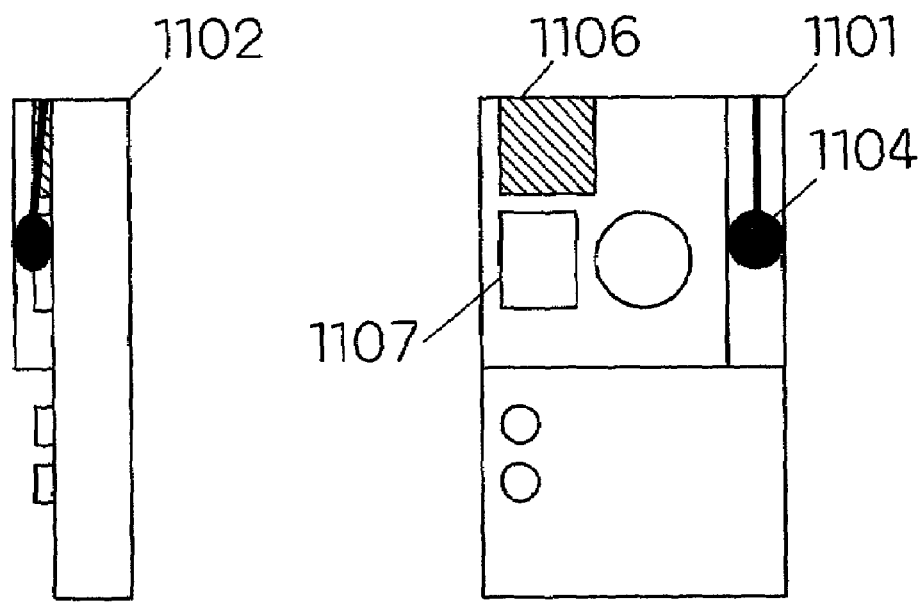
Fig. 11 (c)
Fig. 11 (b)  Fig. 11 (a)

Fig. 14

| EXAMPLE NUMBER | SOURCE LANGUAGE | CONSTITUENT ELEMENTS OF SOURCE LANGUAGE | DEPENDENCE RELATIONSHIPS OF CONSTITUENT ELEMENTS | TARGET LANGUAGE |
|---|---|---|---|---|
| 1 | <日数 (nissu: number of days)> かかります (kakarimasu: it takes) | ① <日数 (nissu: number of days)> ② かかり (kakari: it takes) | (①→②) | It takes ①. |
| 2 | 何か (nanika; any) <薬 (kusuri: medicine)> はありますか (wa arimasuka: is there) | ① 何か (nanika; any) ② <薬 (kusuri: medicine)> ③ あり (ari: there is) | (①→②) (②→③) | Any ②. |
| ... | ... | ... | ... | ... |

Fig. 15

| NAME OF CLASS | SOURCE LANGUAGE | TARGET LANGUAGE |
|---|---|---|
| <果物 (kudamono: fruit)> | りんご<br>(ringo) | apple |
| | みかん<br>(mikan) | orange |
| | いちご<br>(ichigo) | strawberry |
| <薬 (kusuri: medicine)> | 風邪薬<br>(kazegusuri) | cold medicine |
| | アスピリン<br>(asupirin) | aspirin |
| | トローチ<br>(torōchi) | troche |
| | 胃腸薬<br>(ichouyaku) | medicine for the digestion |
| <ペット (petto: pet)> | いぬ<br>(inu) | dog |
| | ねこ<br>(neko) | cat |
| | ウサギ<br>(usagi) | rabbit |

Fig. 18

| SELECTION OF EXAMPLE CANDIDATE | Japanese→English | English→Japanese |

薬ですか
薬はありますか　　1801
薬です

RESULT OF EXAMPLE SELECTION

RESULT OF TRANSLATION

RESULT OF RECOGNITION | 7日薬はありますか

Fig. 20

| SELECTION OF EXAMPLE CANDIDATE | Japanese→English | English→Japanese |

RESULT OF EXAMPLE SELECTION

薬はありますか

RESULT OF TRANSLATION

Any medicine?    — 2001

RESULT OF RECOGNITION   ７日薬はありますか

Fig. 22

```
SELECTION OF                    Japanese→English   English→Japanese
EXAMPLE CANDIDATE
```

RESULT OF EXAMPLE SELECTION

薬はありますか

アスピリン
かぜ薬
トローチ
胃腸薬

RESULT
RECOGNITION    ありますか

| SELECTION OF EXAMPLE CANDIDATE | Japanese→English | English→Japanese |

RESULT OF EXAMPLE SELECTION

アスピリンはありますか

RESULT OF TRANSLATION

Any aspirin?

RESULT OF RECOGNITION  7日薬はありますか

APPARATUS AND METHOD FOR CONVERTING A SPOKEN LANGUAGE TO A SECOND LANGUAGE

DETAILED DESCRIPTION OF THE INVENTION

The present invention relates to a speech converting device which converts input speech of a source language that is phonetically input, to speech of a target language and outputs the converted speech, and also to a speech converting method, a program, and a medium.

RELATED ART OF THE INVENTION

The speech interpretation technique has been developed as software which is to be used by a high-performance work station or a personal computer. If the range of conversation is restricted to traveling conversation or the like, the performance of the technique has achieved a practical level. In order to realize the technique as a speech interpreting device which can be always used by an ordinary user, however, it is required to design hardware the size of which enables such a device to be easily carried in overseas travel or the like, and a user interface which can be simply operated, and to transport software having a similar function to the hardware.

Conventionally, works of transporting speech interpretation software to a notebook personal computer of about B5 size have been conducted.

However, a notebook personal computer of about B5 size does not have dimensions which enable the user to easily carry the computer to use in various places. Since such a notebook personal computer is operated through a conventional keyboard or mouse, its user interface is not easy to operate. Furthermore, the amount of the computation resource required for speech recognition, such as the performance of the CPU and the working memory is usually proportional to the size of the recognition vocabulary.

In hardware of a small size, the computation resource is limited, and hence it is difficult to install words which are necessary and sufficient in number for a speech interpreting device, as the recognition vocabulary, thereby causing a further problem in that the utility value as a speech interpreting device is lowered.

SUMMARY OF THE INVENTION

In view of the problems of a conventional speech interpreting device, it is an object of the invention to provide a speech converting device which can be further miniaturized as compared with a conventional device, and which can be easily operated, a speech converting method, a program, and a medium.

One aspect of the present invention is a speech converting device comprising:

speech inputting means of inputting speech of a first language;

speech recognizing means of recognizing said input speech;

first extracting/displaying means of extracting and displaying one or plural word strings of said first language, said word strings corresponding to a result of said speech recognition;

conversion object selecting means of, from said displayed word strings, selecting a word string which is expected to become an object of conversion to a second language;

second extracting/displaying means of, when a whole or a part of said selected word string is specified, extracting and displaying candidates of a term which corresponds to contents of said specified whole or part of said selected word string;

candidate selecting means of selecting one of said displayed candidates; and converting means of determining said object of conversion to said second language on the basis of said selected word string and said selected candidate, and of converting said determined conversion object to a speech language of said second language.

Another aspect of the present invention is a speech converting device, wherein said first extracting/displaying means has a displaying section comprising a display screen which displays said plural word strings that are objects of said selection, and said selected word in respective predetermined regions, and said second extracting/displaying means overlapingly displays said candidates of a term in a partial region of said display screen in a window form.

Still another aspect of the present invention is a speech converting device, wherein, when said selected word string is displayed on said display screen, said first extracting/displaying means additionally displays also information indicating that candidates of the corresponding term can be displayed, with respect to a part of said word string.

Yet still another aspect of the present invention is a speech converting device, wherein said speech converting device further comprises screen display specifying means of specifying said part of said word string on said display screen, said additional information being displayed with respect to said part of said word string.

Still yet another aspect of the present invention is a speech converting device, wherein said converting means determines a result in which said specified part of said word string is replaced with a term of said selected candidate, as said conversion object.

A further aspect of the present invention is a speech converting method comprising:

a speech inputting step of inputting speech of a first language;

a speech recognizing step of recognizing said input speech;

a first extracting/displaying step of extracting and displaying one or plural word strings of said first language, said word strings corresponding to a result of said speech recognition;

a conversion object selecting step of, from said displayed word strings, selecting a word string which is expected to become an object of conversion to a second language;

a second extracting/displaying step of, when a whole or a part of said selected word string is specified, extracting and displaying candidates of a term which corresponds to contents of said specified whole or part of said selected word string;

a candidate selecting step of selecting one of said displayed candidates; and a converting step of determining said object of conversion to said second language on the basis of said selected word string and said selected candidate, and of converting said determined conversion object to a speech language of said second language.

A still further aspect of the present invention is a program for causing a computer to function as a whole or a part of said speech recognizing means, said first extracting/displaying means, said conversion object selecting means, said second extracting/displaying means, said candidate selecting means, and said converting means of said speech converting device.

A yet further aspect of the present invention is a program for causing a computer to function as a whole or a part of said speech recognizing step, said first extracting/displaying step, said conversion object selecting step, said second extracting/displaying step, said candidate selecting step, and said converting step of said speech converting method.

A still yet further aspect of the present invention is a medium which carries said program, and which is processable by a computer.

An additional aspect of the present invention is a medium which carries said program, and which is processable by a computer.

According to the configuration, for example, the invention can provide hardware of a small size which can be easily operated by the user through a button or a touch panel while being held with one hand. For example, words contained in example sentences which are to be subjected to speech interpretation can be held with being classified, and only a small number of words respectively typifying classes can be installed in a speech recognizing section, as a recognition vocabulary. When a sentence containing a word typifying a class is spoken, examples containing the word can be searched and exhibited to the user. Usually, the user selects a desired one of the examples so as to output translated speech. If required, the user may replace the word with another word in the class so as to output translated speech. When "アスピリンはありますか (Asupirin wa arimasuka (Note; this part shows the pronunciation of this sentence or word using the Roman alphabet: Is there aspiring? (Note; this part shows the meaning of this sentence or word)" is to be input in Japanese, for example, the word "アスピリン (asupirin: aspirin)" is replaced with a word "薬 (kusuri: medicine)" typifying the class to which the word "アスピリン (asupirin: aspirin)" belongs, and "薬はありますか (Kusuri wa arimasuka: Medicine?)" is then spoken. Thereafter, "薬 (kusuri: medicine)" is replaced with "アスピリン (asupirin: aspirin)". As a result of such a stepwise operation, the utility value as a speech interpreting device can be maintained without installing a large-scale recognition vocabulary.

BRIEF DESCRIPTION OF THE DRAWINGS

FIG. 9(a) is a front view showing in detail the structure of the speech interpreting device shown in FIG. 8.

FIG. 9(b) is a side view showing in detail the structure of the speech interpreting device shown in FIG. 8.

FIG. 9(c) is a plan view showing in detail the structure of the speech interpreting device shown in FIG. 8.

FIG. 11(a) is a front view showing the manner of mounting the components of FIG. 2 on a sub case 802.

FIG. 11(b) is a side view showing the manner of mounting the components of FIG. 2 on the sub case 802.

FIG. 11(c) is a plan view showing the manner of mounting the components of FIG. 2 on the sub case 802.

FIG. 14 is a view showing an example of contents of an example database 1205.

FIG. 15 is a view showing an example of contents of a word class lexicon 1206.

FIG. 18 is a view showing display contents of the GUI section 1202 in a process of step 1304.

FIG. 20 is a view showing display contents of the GUI section 1202 in processes of steps 1310 and 1311.

FIG. 22 is a view showing display contents of the GUI section 1202 in a process of step 1307.

FIG. 25 is a view showing display contents of the GUI section 1202 in processes of steps 1310 and 1311.

DESCRIPTION OF THE REFERENCE NUMERALS AND SIGNS

Figure 1:
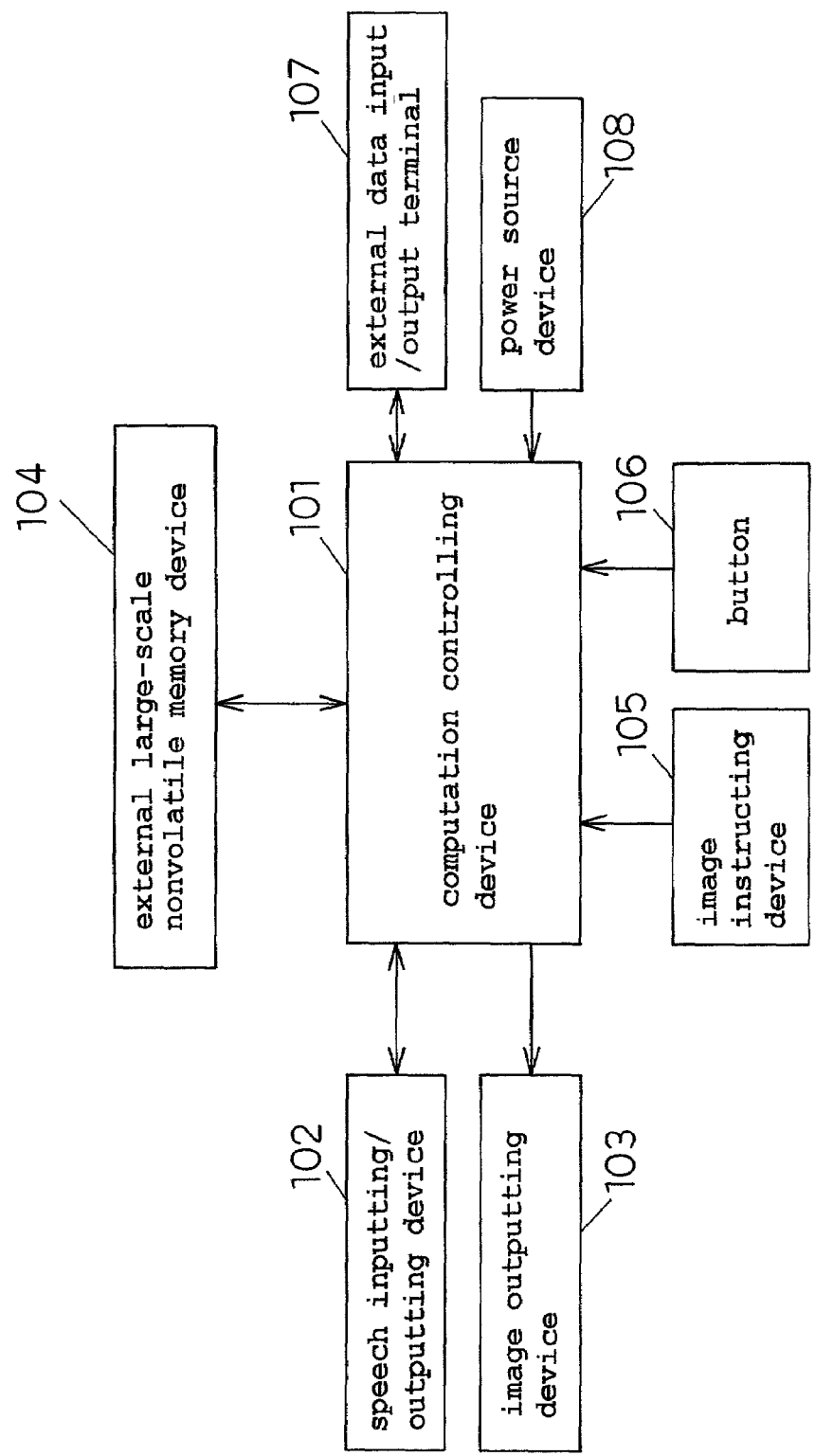
FIG. 1 is a block diagram showing a hardware configuration of a speech interpreting device of an embodiment of the invention.

101 computation controlling device
102 speech inputting/outputting device
103 image outputting device
104 external large-scale nonvolatile memory device
105 image instructing device
106 button
107 external data input/output terminal
108 power source device
201 motherboard
202 2.5-inch hard disk drive
203 speech inputting/outputting device
204 image outputting device
205 image instructing device
206 button
207 external data input/output terminal
208 lithium-ion secondary battery 301 4-inch VGA LCD unit having backlight
302 motherboard
401 touch panel controller
402 3.8-inch pressure sensitive touch panel
403 button
404 button
405 motherboard
501 loudspeaker
502 audio amplifier
503 microphone
504 USB audio interface
505 motherboard
601 main case
602 sub case
603 button
604 button
701 front view
702 right side view
703 plan view
801 main case
802 sub case
803 microphone
804 loudspeaker
805 touch panel/LCD
901 front view
902 right side view
903 plan view
1001 front view
1002 right side view
1003 plan view
1004 motherboard
1005 touch panel/LCD
1006 2.5-inch hard disk drive
1007 button
1008 button
1101 front view
1102 right side view
1103 plan view
1104 microphone
1105 loudspeaker
1106 USB audio interface
1107 audio amplifier
1201 control section
1202 GUI section
1203 speech inputting section
1204 speech recognizing section
1205 example database
1206 word class lexicon
1207 example selecting section
1208 word selecting section
1209 alternative word selecting section
1210 language converting section
1211 speech synthesizing section
1301 step of determining direction of translation
1302 step of performing speech recognition
1303 step of searching example from example data base
1304 step of selecting example
1305 step of judging whether example is to be corrected, or to be corrected
1306 step of determining word to be corrected
1307 step of obtaining list of alternative words
1308 step of determining alternative word
1309 step of correcting example
1310 step of performing language conversion
1311 step of performing speech synthesis
1601 translation direction designating area
1602 translation direction designating area
1603 recognition result displaying area
1604 example candidate displaying area
1605 example selection result displaying area
1606 translation result displaying area
1607 button SW1
1608 button SW2
1701 translation direction designating area
1702 recognition result displaying area
1703 example candidate displaying area
1801 selected example
1901 example selection result displaying area
1902 example candidate displaying area
2001 translation result displaying area
2101 example selection result displaying area
2201 list window
2301 selected alternative word
2401 example selection result displaying area

PREFERRED EMBODIMENTS OF THE INVENTION

Hereinafter, the configuration and operation of a speech interpreting device which is an embodiment of the speech converting device of the invention will be described with reference to the accompanying drawings, and also the operation of the speech converting method of the invention will be described.

FIG. 1 is a block diagram showing the hardware configuration of the speech interpreting device of the embodiment.

A speech inputting/outputting device 102 receives speech of the source language spoken by the user, and outputs speech which is interpreted into the target language. An image outputting device 103 displays examples which are to be interpreted by the interpreting device. An image instructing device 105 and buttons 106 are used for enabling the user to select one of the examples displayed on the image outputting device 103. A computation controlling device 101 converts phonetically and linguistically data of the source language that are input through the speech inputting/outputting device 102, the image instructing device 105, and the buttons 106, into those of the target language, and supplies the converted data to the speech inputting/outputting device 102 and the image outputting device 103. An external large-scale nonvolatile memory device 104 holds programs for instructing the computation controlling device 101 on process procedures, and data. An external data input/output terminal 107 is used for exchanging programs and data between the computation controlling device 101 and external apparatuses. A power source device 108 supplies an electric power required for driving the computation controlling device 101.

The speech inputting means in the invention corresponds to the speech inputting/outputting device 102, and the first and second extracting/displaying means in the invention correspond to the configuration including the image outputting device 103, the computation controlling device 101, etc. The screen display specifying means in the invention corresponds to the image instructing device 105 and the buttons 106. The first language in the invention corresponds to the source language in the embodiment, and the second language in the invention corresponds to the target language in the embodiment.

Figure 2:
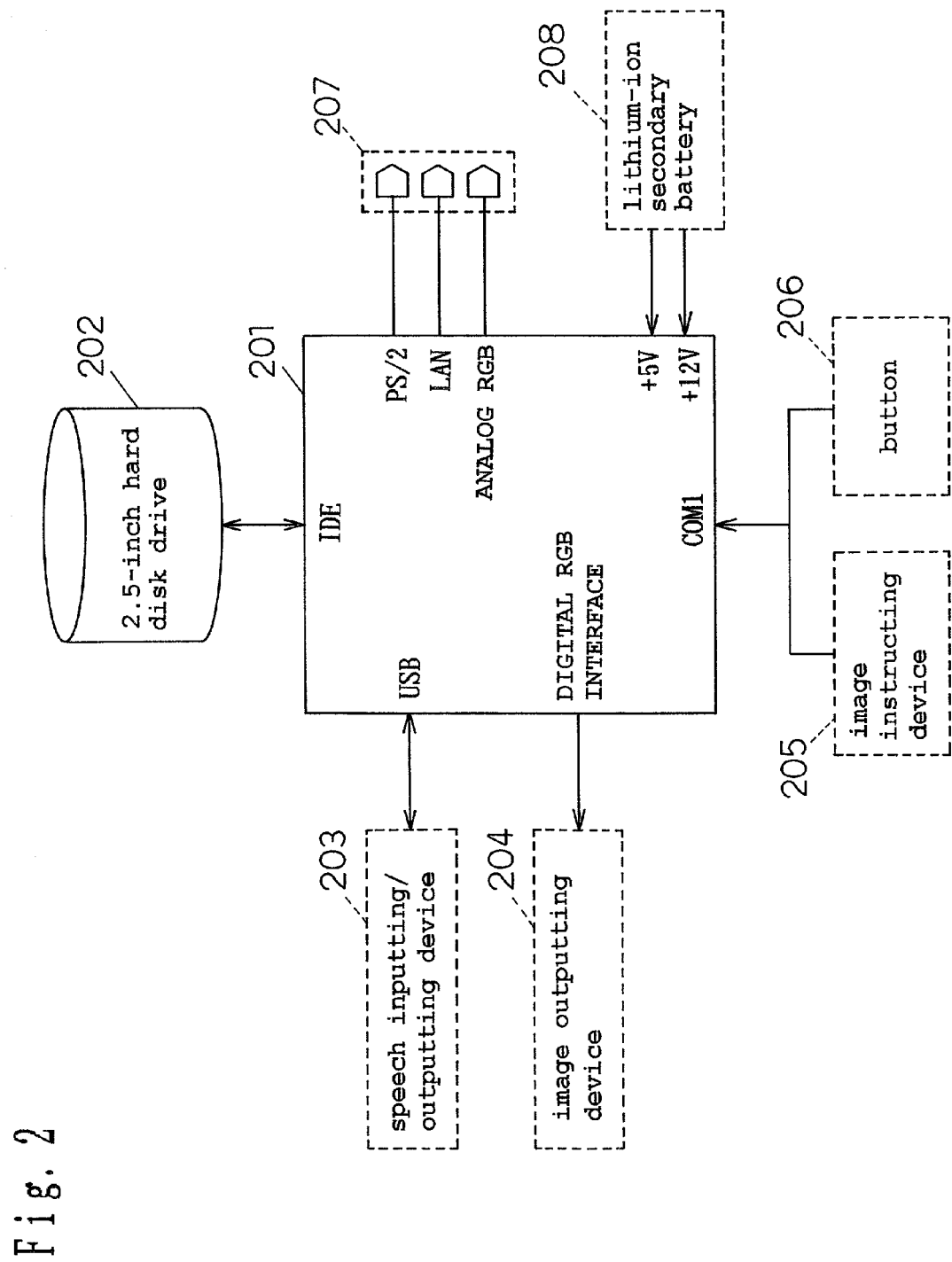
FIG. 2 is a detailed block diagram in the case where a PC/AT compatible motherboard is used.

FIG. 2 shows a specific configuration example in which a PC/AT compatible motherboard is used in the computation controlling device 101. A speech inputting/outputting device 203 is connected to a motherboard 201 by using a USB connector of the motherboard. An image outputting device 204 is connected to the motherboard 201 by using a digital RGB interface terminal of the motherboard. A 2.5-inch hard disk drive 202 is used as the external large-scale nonvolatile memory device 104, and connected to the motherboard 201 via an IDE interface. A flash memory disk may be used in place of the hard disk drive. A lithium-ion secondary battery 208 is used as the power source device 108 to supply voltages of +5 V and +12 V to the motherboard 201. Among input/output terminals of the motherboard 201, an analog display output terminal, a local area network terminal, and a keyboard terminal are led out to constitute an external data input/output terminal 207.

Figure 3:
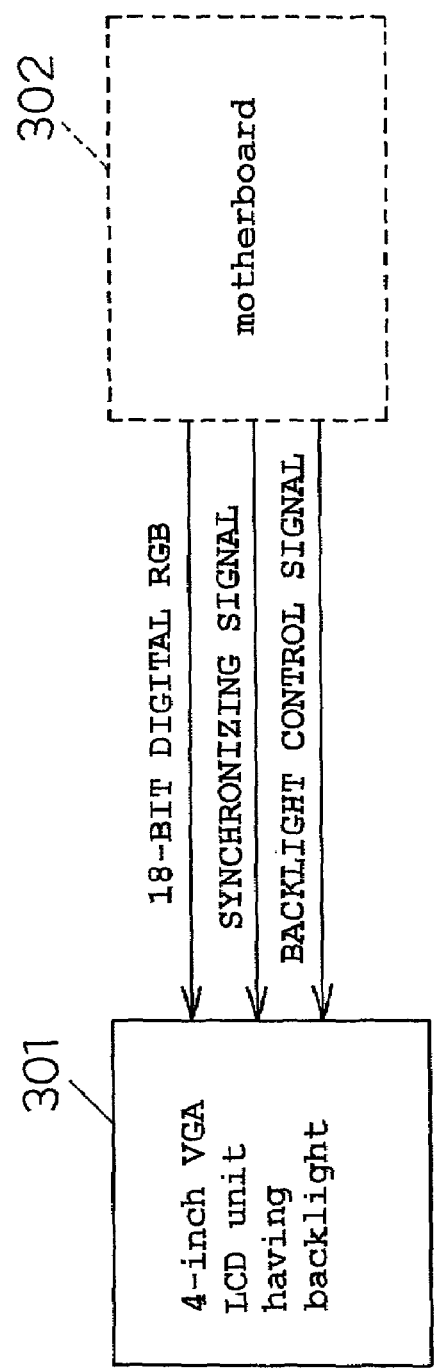
FIG. 3 is a detailed block diagram of an image outputting device 204.

FIG. 3 shows the configuration of the image outputting device 204 in detail. An LCD unit 301 of the VGA resolution has a 4-inch display area. A backlight configured by a cold cathode ray tube is mounted on the back of the LCD unit. Eighteen bits of a digital RGB interface of a motherboard 302 are used for connecting the LCD unit. Also a video synchronizing signal and a control signal for the backlight are connected to the motherboard.

Figure 4:
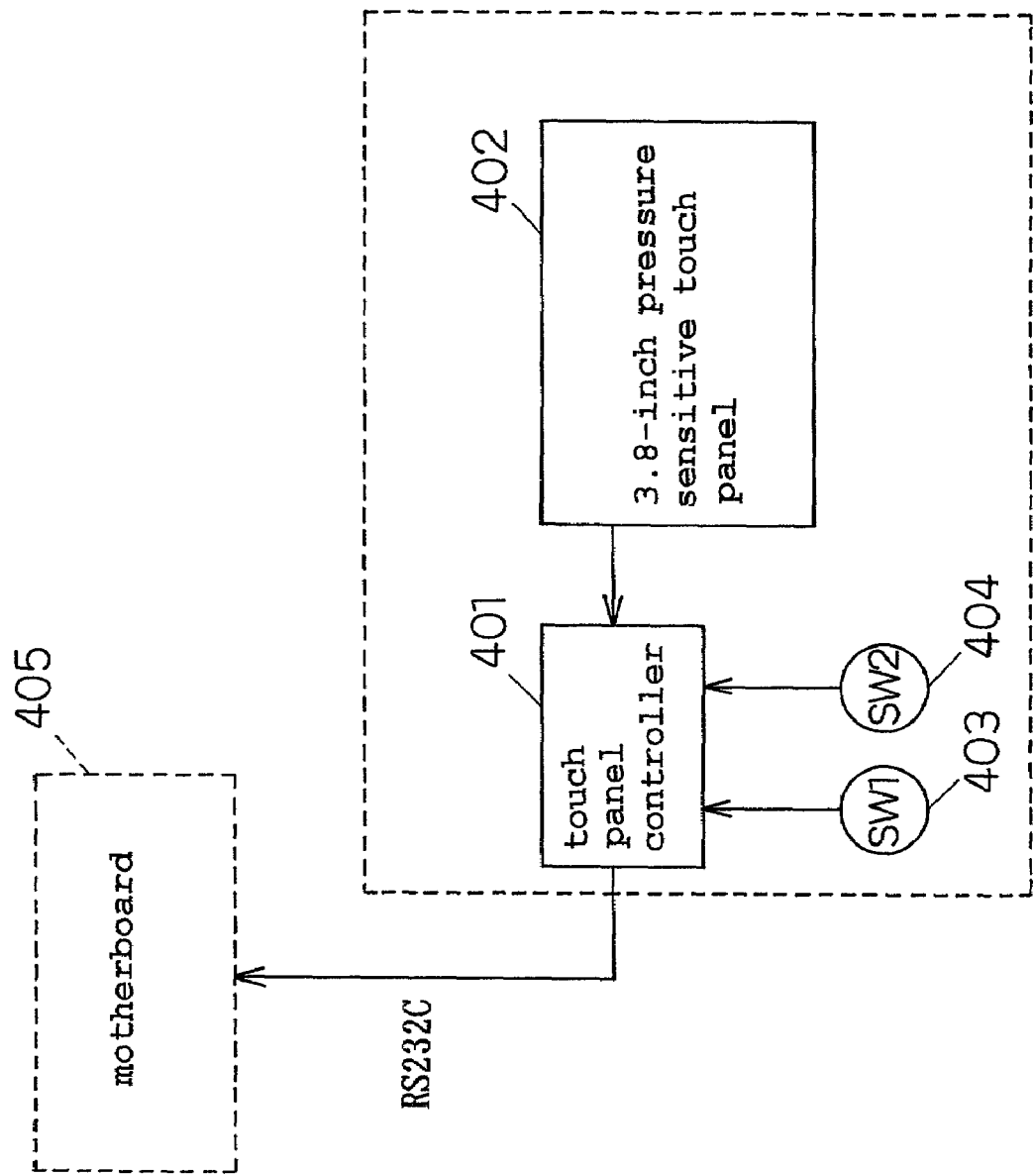
FIG. 4 is a detailed block diagram of an image instructing device 205 and buttons 206.

FIG. 4 shows the configuration of an image instructing device 205 and buttons 206 in detail. A 3.8-inch pressure sensitive touch panel 402 is connected to a touch panel controller 401 so that X- and Y-coordinates of a pressed position which are converted into serial data according to the RS232C standard are connected to a serial terminal COM1 of a motherboard 405. Buttons 403 and 404 are connected to the touch panel controller 401 so that information indicative of ON or OFF of the buttons is added to information of the pressed position. The received serial data are decoded by device driver software for the touch panel controller 401 mounted on the motherboard 405. A mouse click event occurs so that the button 403 corresponds to the left button in the case where a mouse is connected to the motherboard 405, and the button 404 to the right button.

Figure 5:
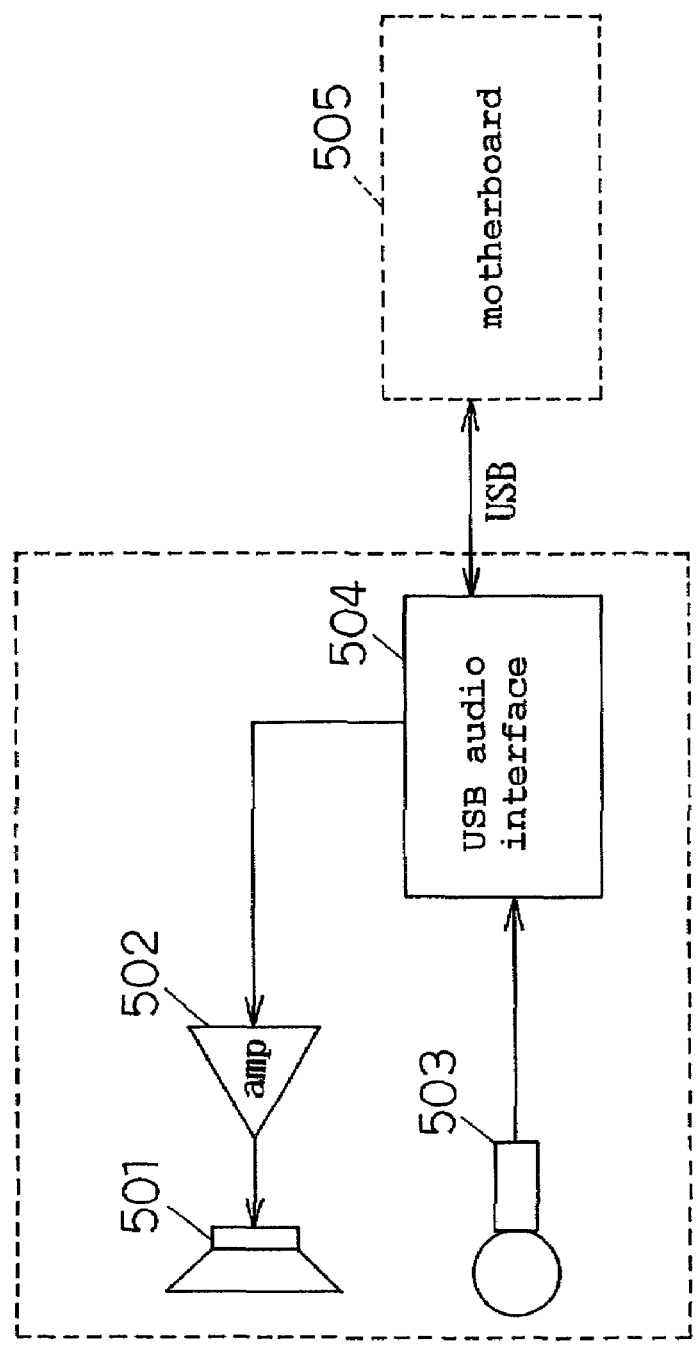
FIG. 5 is a detailed block diagram of a speech inputting/outputting device 203.

FIG. 5 shows the configuration of the speech inputting/outputting device 203 in detail. A USB audio interface 504 converts incoming analog speech into digital data to transmit the digital data to a motherboard 505 (corresponding to 201 of FIG. 2), and converts digital data transmitted from the motherboard 505 into analog speech. A USB interface is used in the transmission and reception of digital data. A microphone 503 is used for collecting analog speech. An output of the USB audio interface 504 is amplified by an audio amplifier 502 and then output through a loudspeaker 501. An audio interface mounted on the motherboard 505 may be used in place of the USB audio interface 504.

Figure 6:
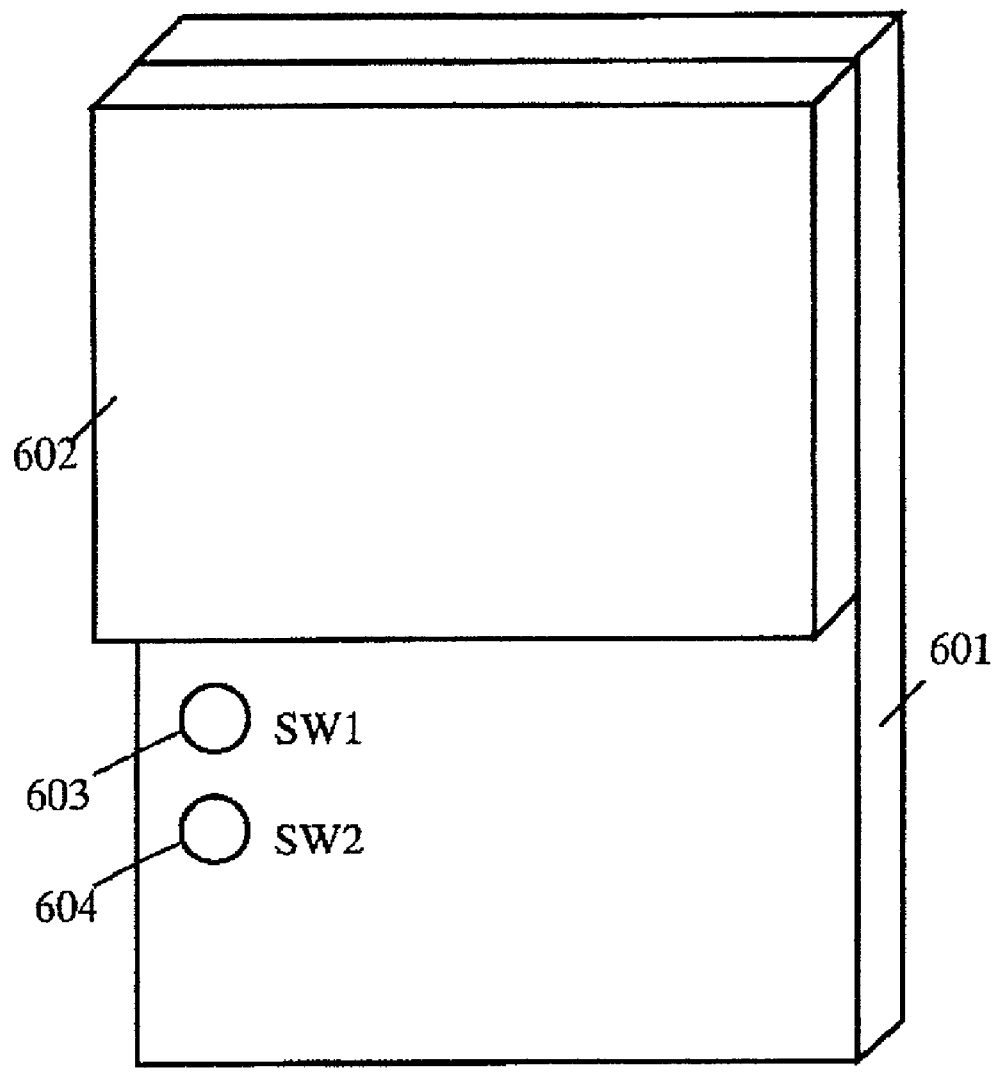
FIG. 6 is an overall view of a case when the speech interpreting device is not used.
Figure 7:
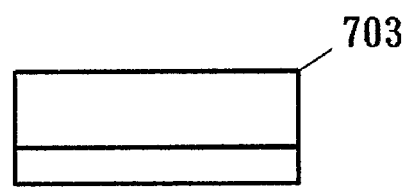
FIG. 7(a) is a front view showing in detail the structure of the speech interpreting device shown in FIG. 6.
FIG. 7(b) is a side view showing in detail the structure of the speech interpreting device shown in FIG. 6.
FIG. 7(c) is a plan view showing in detail the structure of the speech interpreting device shown in FIG. 6.
Figure 7:
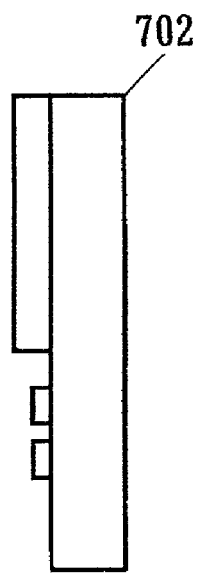
Figure 7:
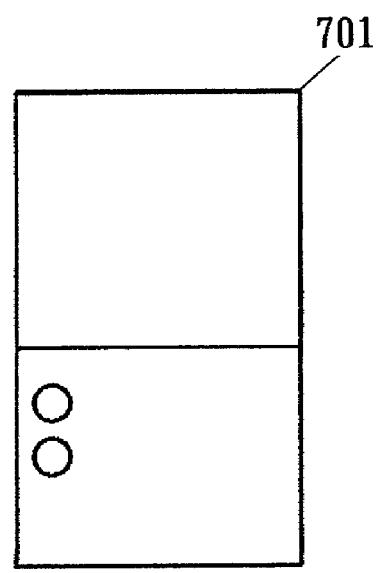

FIG. 6 is a perspective view of an example in which the configuration of FIG. 2 is mounted in a case that can be held by the user with one hand, and FIGS. 7(a) to 7(c) are trihedral views of the example. The image instructing device 205, the image outputting device 204, and the buttons 206 are mounted on the main case 601. The reference numerals 603 and 604 correspond to the buttons 403 and 404, respectively. The speech inputting/outputting device 203 is mounted on a sub case 602. When the interpreting device is not to be used, the sub case 602 covers the display screen of the image outputting device 204 so as to protect the screen.

Figure 8:
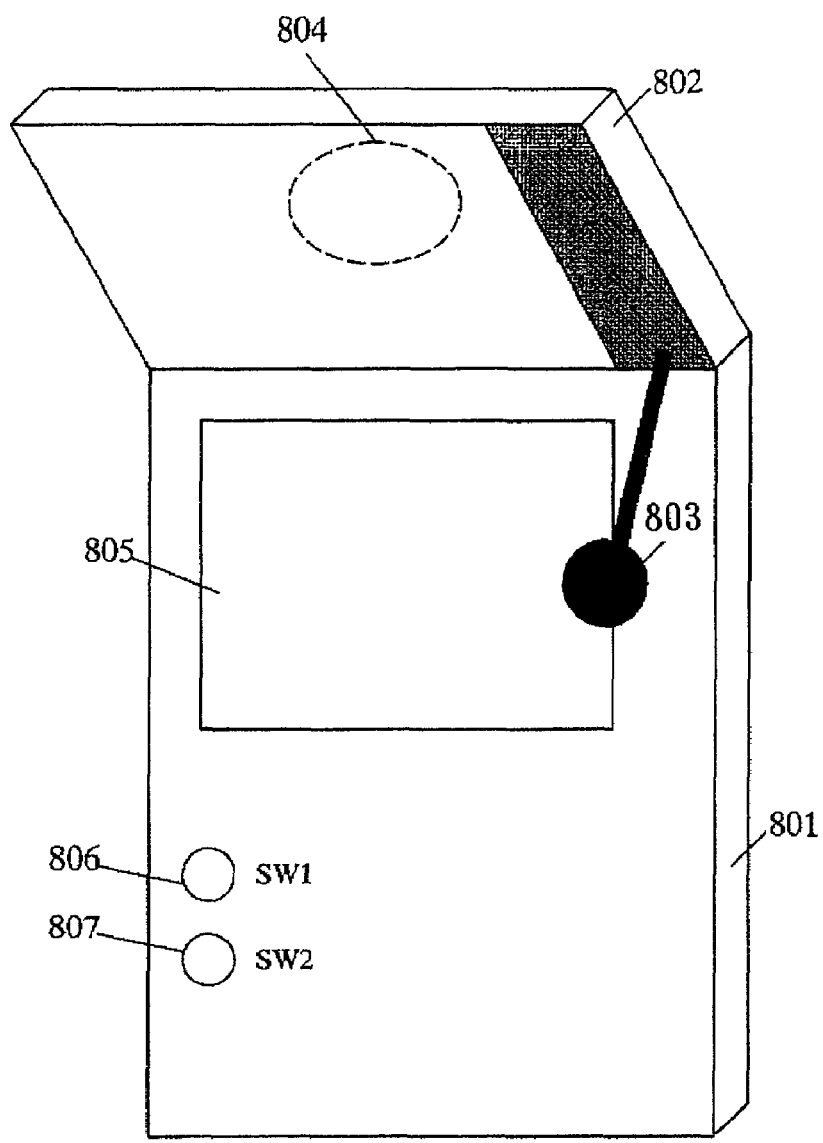
FIG. 8 is an overall view of the case when the speech interpreting device is used.

When the interpreting device is to be used, as shown in FIG. 8, a sub case 802 is moved to a predetermined position where the direction of the directionality of the speech inputting/outputting device 203 (a microphone 803) is oriented to the face of the user. FIGS. 9(a) to 9(c) are trihedral views showing this situation. Specifically, a loudspeaker 804 mounted on the sub case 802 is raised so as to be directed toward the user, and also the microphone 803 is similarly raised. Under this state, a touch panel/LCD 805 can be used.

Figure 10:
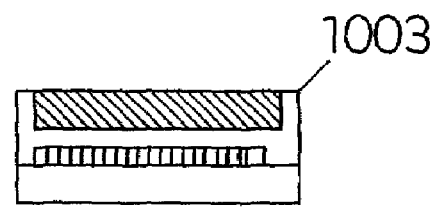
FIG. 10(a) is a front view showing the manner of mounting components of FIG. 2 on a main case 801.
FIG. 10(b) is a side view showing the manner of mounting the components of FIG. 2 on the main case 801.
FIG. 10(c) is a plan view showing the manner of mounting the components of FIG. 2 on the main case 801.
Figure 10:
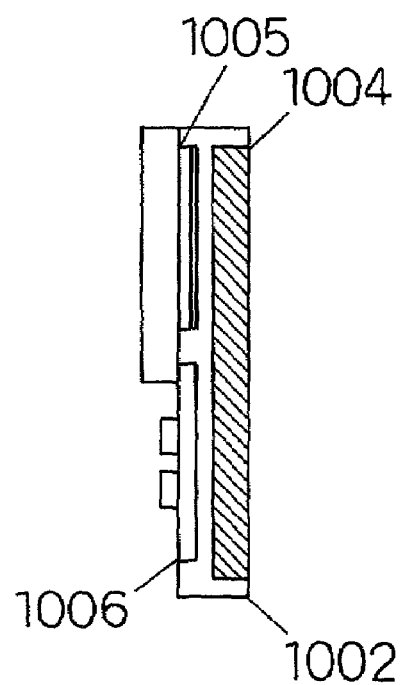
Figure 10:
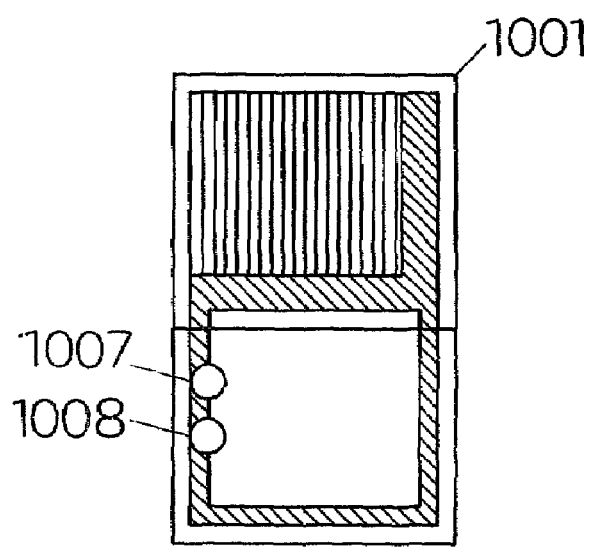

FIGS. 10(a) to 10(c) show the manner of mounting components on the main case 601. The 4-inch VGA LCD unit 301 and the touch panel 402 overlap each other to be mounted as a touch panel/LCD 1005. FIGS. 11(a) to 11(c) show the manner of mounting components on the sub case 602.

Figure 12:
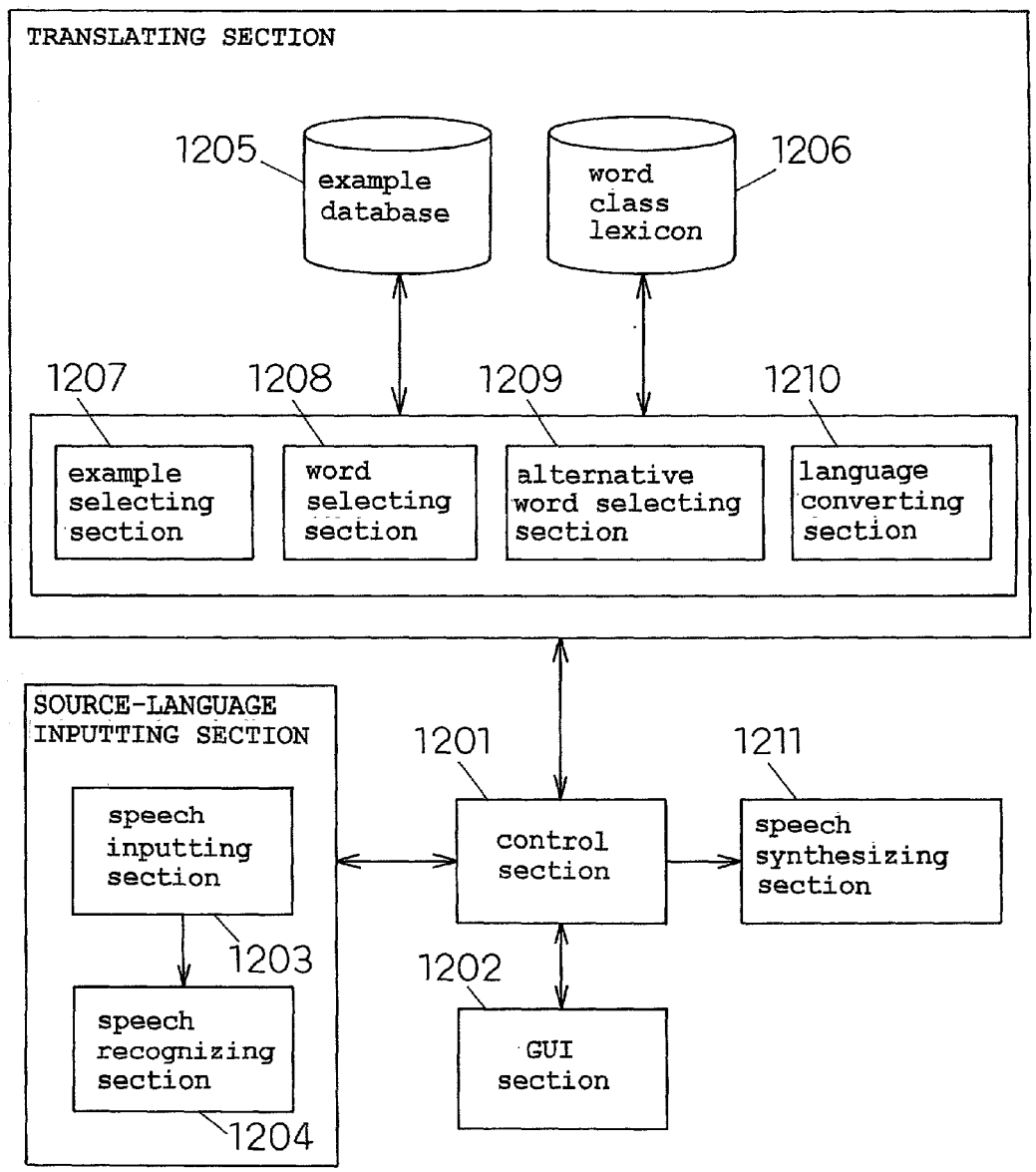
FIG. 12 is a block diagram showing a software configuration of the speech interpreting device of the embodiment of the invention.

FIG. 12 shows a software configuration which is an embodiment of programs and data in the invention. In FIG. 12, 1201 denotes a control section which instructs components and controls the flow of data from the components, 1202 denotes a GUI (Graphical User Interface) section which displays information sent from the control section 1201 and sends an input by the user to the control section 1201, 1203 denotes a speech inputting section which collects speech of the user in response to instructions from the control section 1201, 1204 denotes a speech recognizing section which continuously recognizes the speech of the user sent from the speech inputting section, 1205 denotes an example database which holds correspondences between examples of the source language and the target language, 1206 denotes a word class lexicon which holds classified words in the example database 1205, 1207 denotes an example selecting section which refers the example database 1205 to select an example on the basis of a result of the speech recognition sent from the control section 1201, 1208 denotes a word selecting section which selects a classified word from the example selected by the example selecting section 1207 in accordance with instructions from the control section 1201, 1209 denotes an alternative word selecting section which refers the word class lexicon 1206 to select an alternative word that is replaceable with a classified word designated by the control section 1201, 1210 denotes a language converting section which refers the example database 1205 and the word class lexicon 1206 to convert an example designated by the control section 1201 into a sentence of the target language, and 1211 denotes a speech synthesizing section which applies speech synthesis on an example sentence of the target language and designated by the control section.

The speech recognizing means in the invention corresponds to the speech recognizing section 1204, and the conversion object selecting means in the invention corresponds to the example selecting section 1207, etc. The screen display specifying means in the invention corresponds to the word selecting section 1208, etc., and candidate selecting means in the invention corresponds to the alternative word selecting section 1209, etc. The converting means in the invention corresponds to the configuration including the language converting section 1210, the speech synthesizing section 1211, etc.

FIG. 14 shows a specific example of the example database 1205. Each example corresponds to one sentence of conversation, and holds a correspondence between the source language and the target language together with predetermined information (constituent elements of the source language, and dependence relationships between the constituent elements). The words of the source language and enclosed in < > are classified words. Each classified word is replaceable with a word in the same class.

FIG. 15 shows a specific example of the word class lexicon 1206. The term "class" means a word of high abstractness such as "果物 (kudamono: fruit)". The words belonging to a class are words which express specific subjects of the class, such as "りんご (ringo: apple)" and "みかん (mikan: orange)". The abstractness of the classification can be changed in accordance with the performance of the speech recognizing section 1204, so that the example selection can be efficiently performed. The word class lexicon 1206 may be configured with hierarchizing the classes.

Figure 16:
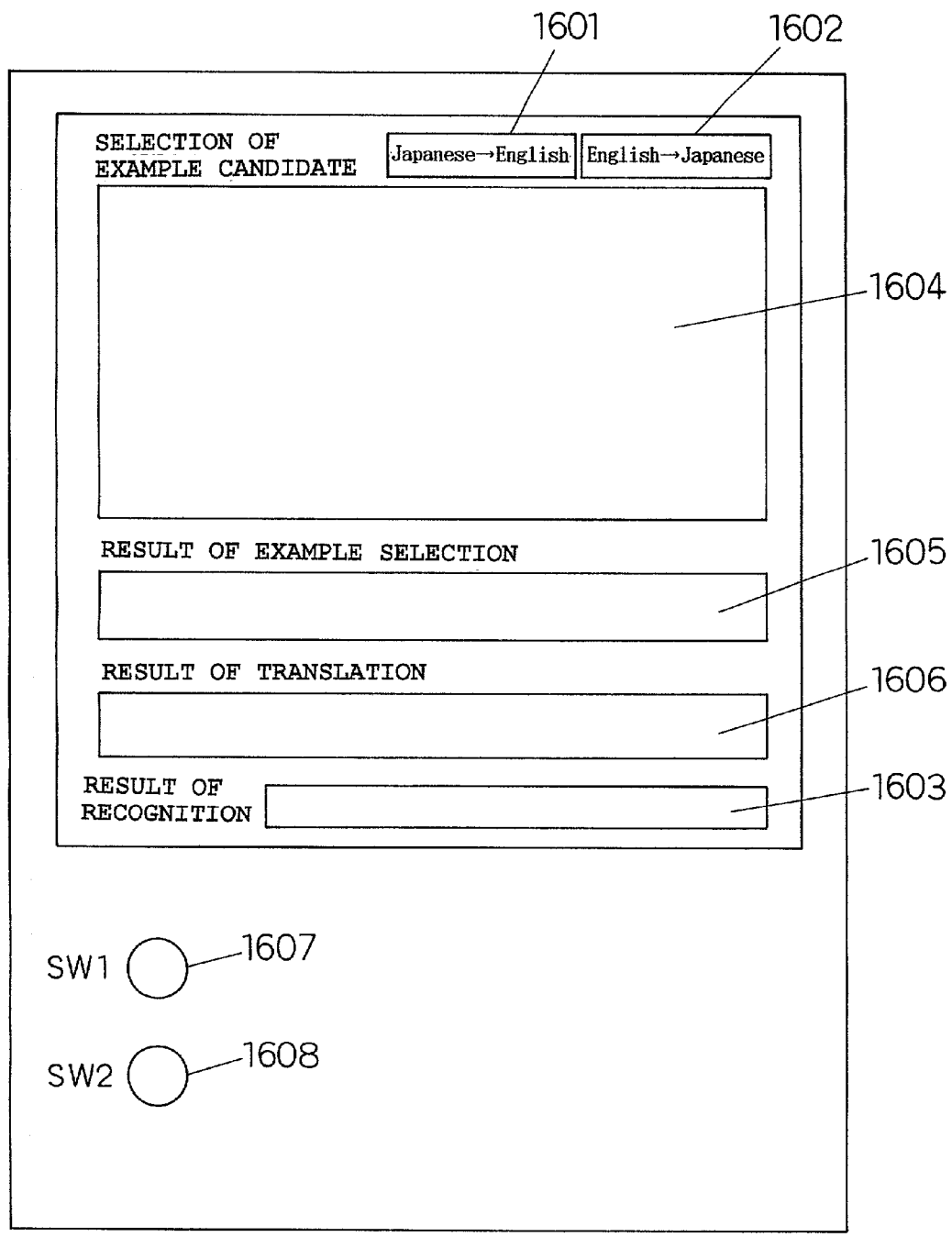
FIG. 16 is a view showing display contents of a GUI section 1202.

FIG. 16 shows in detail the GUI section 1202 which is displayed on the touch panel/LCD 805. The reference numeral 1601 denotes a translation direction designating area in which the direction of translation is designated, 1603 denotes a speech recognition result displaying area in which a result of speech recognition by the speech recognizing section 1204 is displayed, 1604 denotes an example candidate displaying area in which example sentences selected by the example selecting section 1207 are displayed, 1605 denotes an example selection result displaying area in which an example designated by the user is displayed, and 1606 denotes a translation result displaying area in which an example that is converted into the target language by the language converting section is displayed. The reference numerals 1607 and 1608 correspond to the buttons 806 and 807 which enable the user to perform an input operation, respectively. The user can perform a pointing input on the touch panel/LCD 805.

Figure 13:
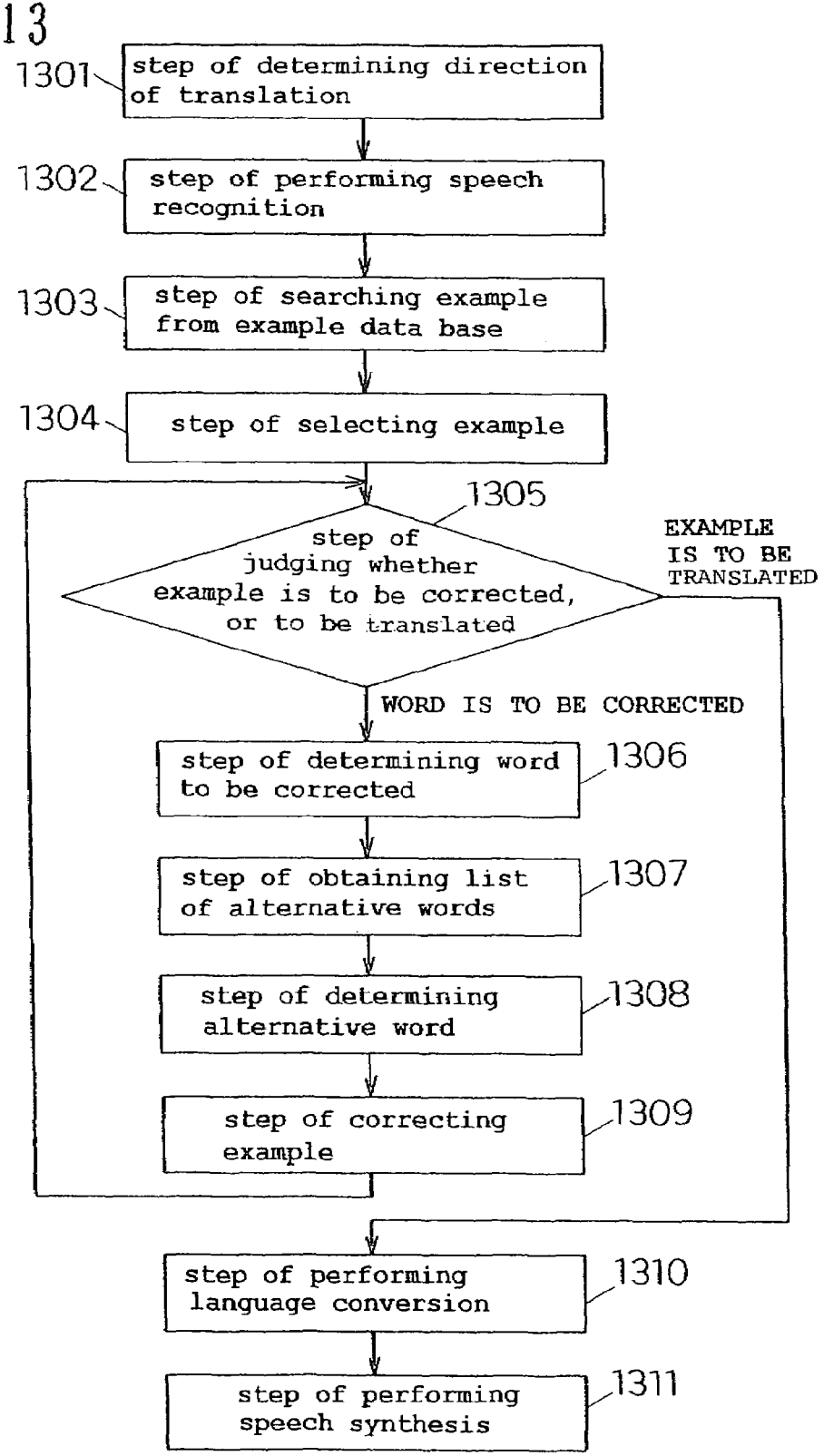
FIG. 13 is a flowchart showing the process flow of the software.

FIG. 13 is a flowchart of the software in the invention. The reference numeral 1301 denotes a step of selecting the direction of translation, 1302 denotes a step of inputting speech through the microphone 803 and performing speech recognition, 1303 denotes a step of searching examples from the example database 1205 on the basis of a result of the speech recognition, 1304 denotes a step of selecting an example by the user from the searched examples, 1305 denotes a step of judging whether the example selected in step 1304 is to be corrected, or to be translated, 1306 denotes a step of selecting a word which is in the example selected in step 1304, and which is to be corrected, 1307 denotes a step of outputting a list of words which are replaceable with the word that is selected in step 1306 to be corrected, 1308 denotes a step of selecting a word desired by the user, from the word list output in step 1307, and 1309 denotes a step of changing the example so as to replace the word to be corrected with the word selected in step 1308. The reference numeral 1310 denotes a step of converting the example sentence determined in step 1305, into the target language, and 1311 denotes a step of speech synthesizing the example which is converted into the target language in step 1309, and outputting the synthesized example through the loudspeaker 804.

Hereinafter, the operation of the software in the invention will be described with reference to the flowchart of FIG. 13, and display contents of the GUI section 1202 which are displayed on the touch panel/LCD 805, and which are shown in FIGS. 17 to 25. An example in which the user wishes to translate a sentence "アスピリンはありますか (Asupirin wa arimasuka: Is there Aspirin?)" will be described. Specifically, the user first input "薬はありますか (Kusuri wa arimasuka: Is there Medicine?)", and then performs an operation of replacing "薬 (kusuri: medicine)" with "アスピリン (asupirin: aspirin)". In the invention, two kinds of input operations using the touch panel and the buttons are enabled. Hereinafter, the touch panel input, and the button input will be described in this sequence.

Figure 17:
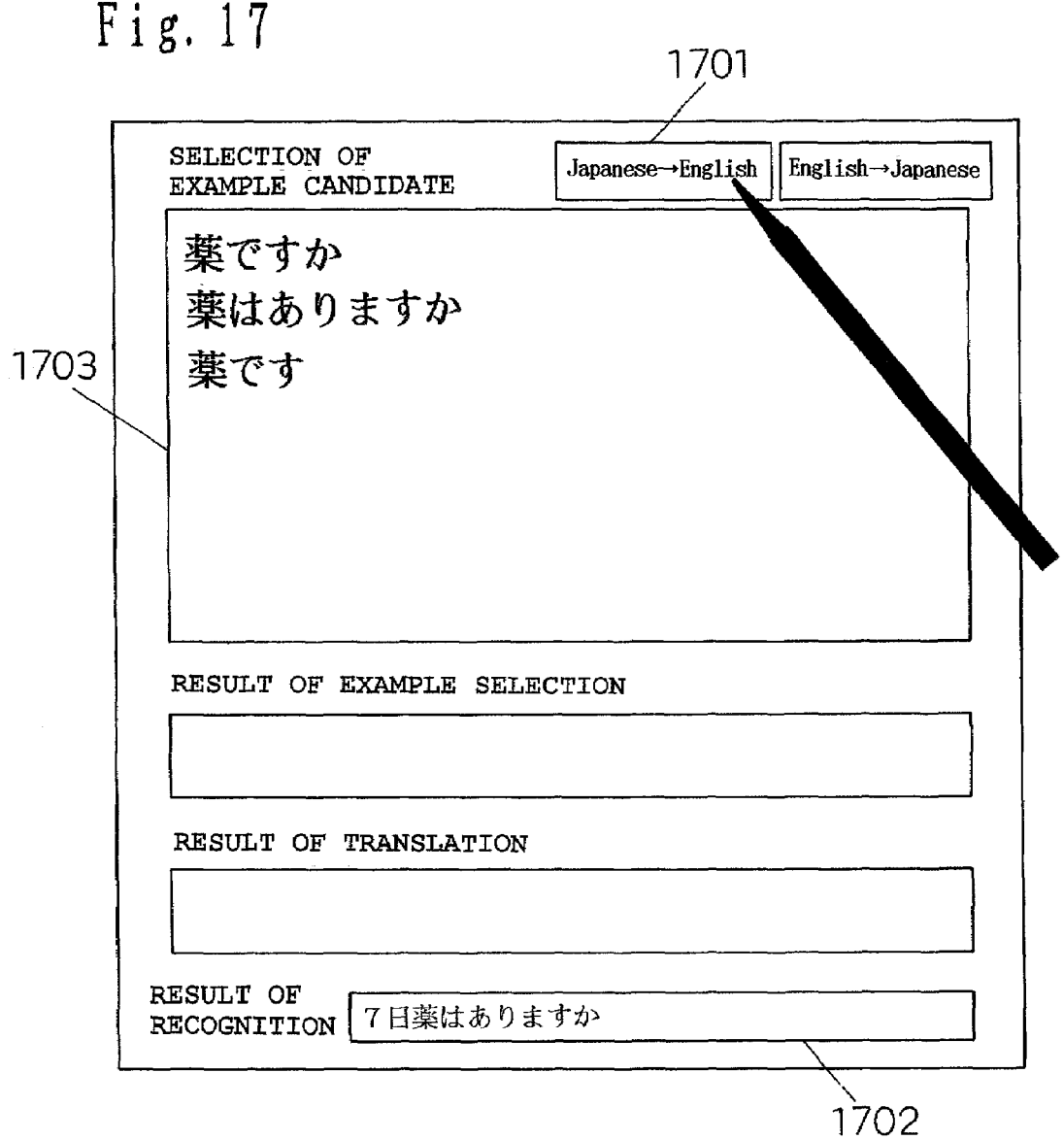
FIG. 17 is a view showing display contents of the GUI section 1202 in steps 1301 to 1303.

FIG. 17 shows display contents of the GUI section 1202 from steps 1301 to 1303 in the case of the touch panel input. In step 1301, the user clicks on a translation direction designating area 1701 by means of the touch panel input to designate translation in the direction of Japanese to English. At this time, the GUI section 1202 transmits the direction of translation to the control section 1201, and the control section 1201 instructs the speech inputting section 1203 to perform a speech input. The user pronounces "何か薬はありますか (Nanika kusuri wa arimasuka: Any medicine?)" by using the microphone 803. The speech inputting section 1203 transmits the input speech to the speech recognizing section 1204. In step 1302, the speech recognizing section 1204 performs speech recognition corresponding to the designated direction of translation. It is assumed that a recognition result "七日薬はありますか (Nanoka kusuri wa arimasuka: Seventh day, medicine?)" containing erroneous recognition is transmitted to the control section 1201. The control section 1201 transmits the result of speech recognition to the GUI section 1202 and the example selecting section 1207. The GUI section 1202 displays the transmitted result of speech recognition in a speech recognition result displaying area 1702. By contrast, in step 1303, the example selecting section 1207 searches examples by the method described below on the basis of the result of speech recognition, and transmits the searched examples to the control section 1201. The example selecting section 1207 extracts a set of keywords "七日 (nanoka: seventh day)", "薬 (kusuri: medicine)", and "あり (ari: there is)" which are defined in the example database 1205, from the result of speech recognition "七日薬はありますか (Nanoka kusuri wa arimasuka: Seventh day, medicine?)". "七日 (nanoka: seventh day)" belongs to the classified word <日数 (nissu: number of days)>, and "薬 (kusuri: medicine)" belongs to the classified word <薬 (kusuri: medicine)>. "あり (ari: there is) does not belong to any classified word.

The example selecting section 1207 sequentially checks the dependence relationships of the constituent elements shown in FIG. 14, and, from examples in which one or more dependence relationships are established, selects examples in descending order of the number of the established dependence relationships. With respect to the example of example No. 1, for example, "かかり (kakari: it takes)" does not exist in the keyword set. Therefore, the number of the established dependence relationships is 0. With respect to the example of example No. 2, "何か (nanika; any)" does not exist in the keyword set, and hence, in the dependence relationships of the constituent elements, (①→②) does not established but (②→③) is established. Therefore, the number of the established dependence relationships is 1.

When the example selecting section 1207 is designed so as to select an example in which the number of the established dependence relationships is 1 or more, from the example database 1205, the example of example No. 1 in FIG. 14 is not selected, and the example of example No. 2 is selected. "何か (nanika; any)" does not exist in the keyword set. With respect to the selected example of example No. 2, therefore, a display of "薬はありますか (Kusuri wa arimasuka: Is there Medicine?)" is output. In the following description, it is assumed that the other examples "薬ですか (Kusuri desuka: Do you need medicine?)" and "薬です (Kusuri desu: Yes, medicine)" in the example database 1205 are selected in the same manner as described above. The control section 1201 transmits the example sentences sent from the example selecting section 1207 to the GUI section 1202. The GUI section 1202 displays the selected example sentences in an example candidate displaying area 1703.

FIG. 18 shows display contents of the GUI section 1202 in step 1304. In step 1304, from the example candidates displayed in the example candidate displaying area 1703, the user selects the example "薬はありますか (Kusuri wa arimasuka: Is there Medicine?)" which is identical in meaning with the sentence pronounced by the user, by clicking on a zone 1801 by means of the touch panel input. At this time, the GUI section 1202 transmits the selected example sentence to the control section 1201.

Figure 19:
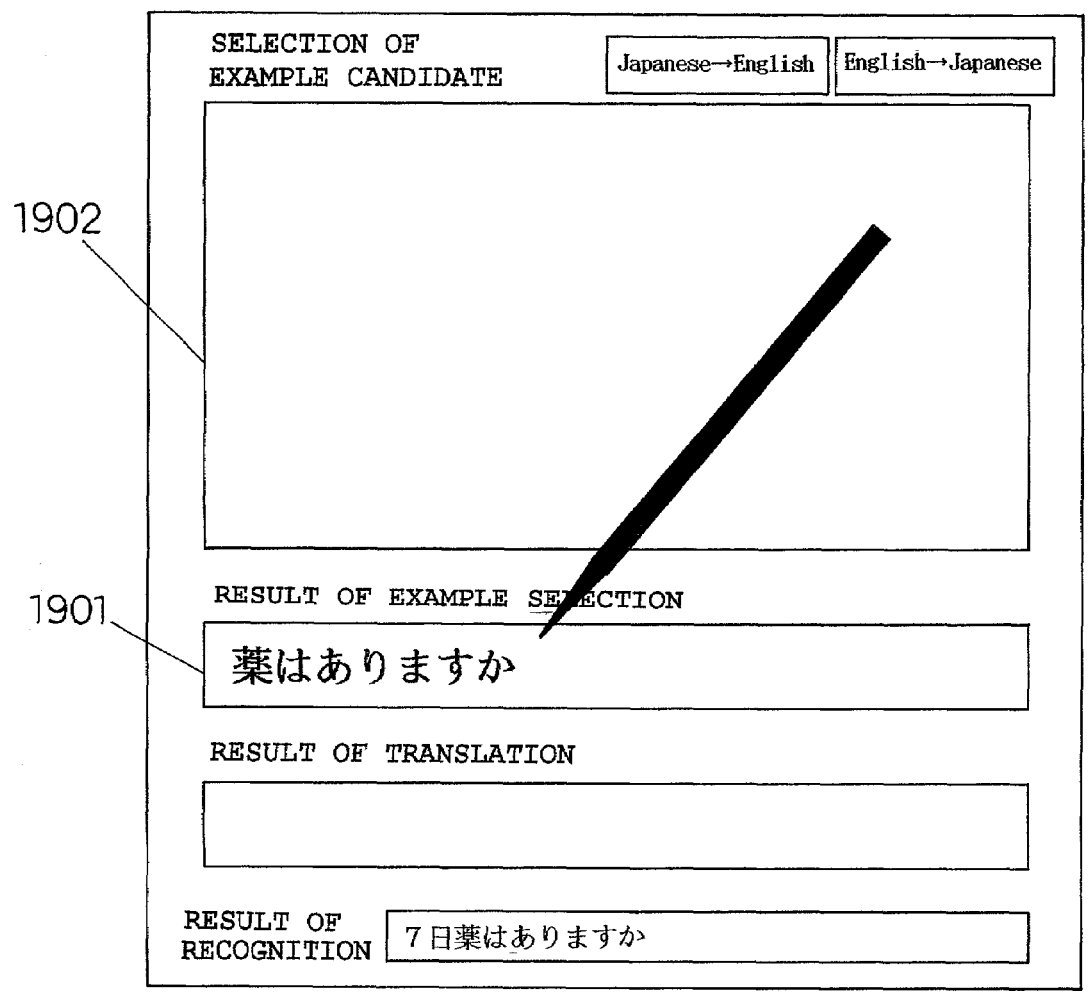
FIG. 19 is a view showing display contents of the GUI section 1202 in a process of step 1305.

FIG. 19 shows display contents of the GUI section 1202 in step 1305. In step 1305, the GUI section 1202 displays the selected example sentence in an example selection result displaying area 1901, and clears an example candidate displaying area 1902. Thereafter, it is selected whether the example is determined to be translated, or corrected to replace a classified word with a replaceable word. At this time, the user can determine the example by clicking on the example selection result displaying area 1901 in the touch panel. The determined example is transmitted to the control section 1201. When the user double-clicks on the example selection result displaying area 1901 in the touch panel, the control can be transferred to a mode in which a word in the example is replaced.

FIG. 20 shows display contents of the GUI section 1202 in the case where an example is determined in step 1305. In step 1310, the control section 1201 transmits the example "薬はありますか(Kusuri wa arimasuka: Is there Medicine?)" which is determined by the user, to the language converting section 1210. The language converting section 1210 converts the transmitted example into "Any medicine" of the target language by using the example database 1205, and transmits the result of conversion to the control section 1201. The control section 1201 transmits the result of conversion to the GUI section 1202 and the speech synthesizing section 1211. In step 1311, the GUI section 1202 displays the result of conversion in a translation result displaying area 2001. On the other hand, the speech synthesizing section 1211 applies speech synthesis on the result of conversion and then outputs the synthesized speech through the loudspeaker 804.

Figure 21:
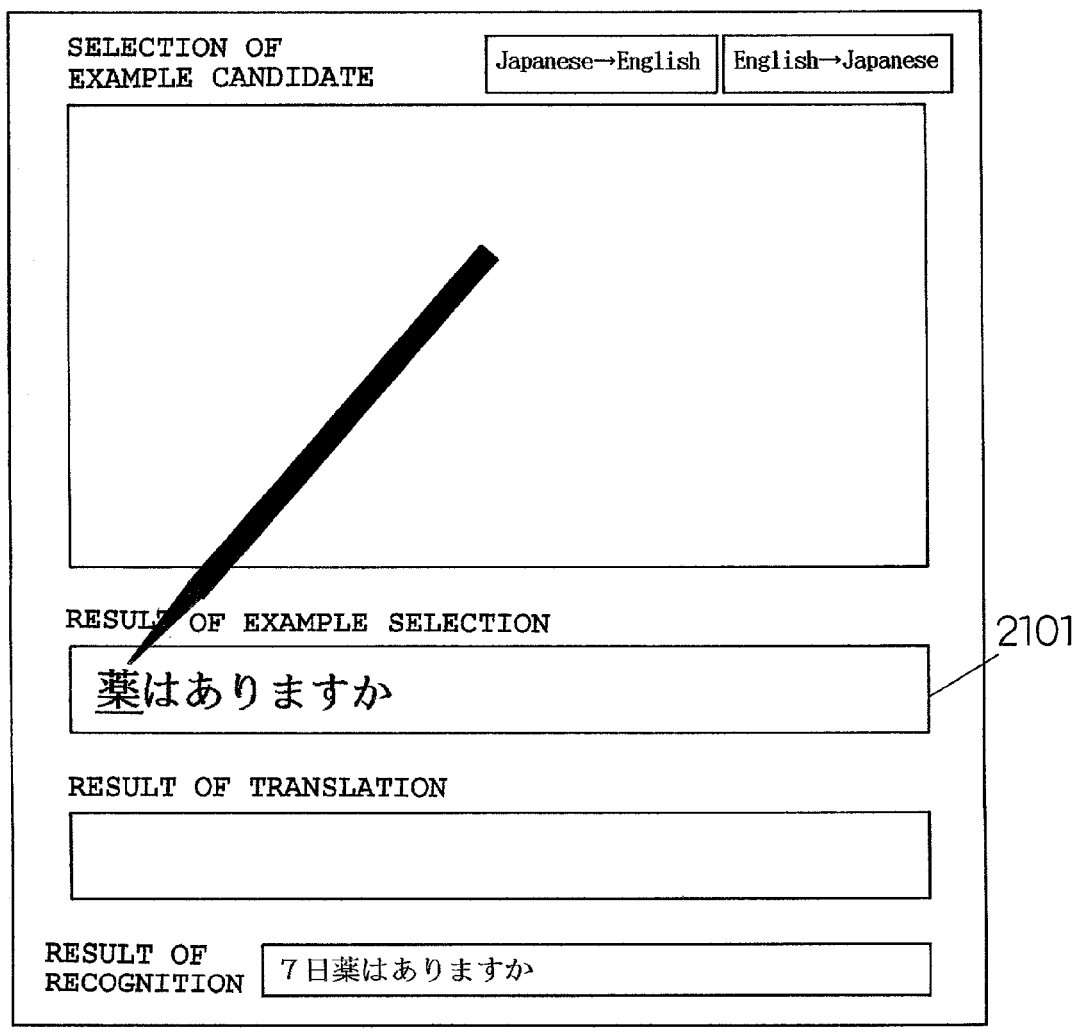
FIG. 21 is a view showing display contents of the GUI section 1202 in a process of step 1306.

FIG. 21 shows display contents of the GUI section 1202 in step 1306. In step 1306, the user selects a word which is to be changed in the case where the word selection mode is selected in step 1305. At this time, the control section 1201 instructs the word selecting section 1208 to perform an operation of selecting a word. The word selecting section 1208 extracts a classified word "薬 (kusuri: medicine)" from the example, and then transmits the extracted word to the control section 1201. The control section 1201 transmits the word to the GUI section 1202. The GUI section 1202 underlines "薬 (kusuri: medicine)" which is displayed in an example selection result displaying area 2101 to indicate the user that the word is a replaceable word. The user then clicks on "薬 (kusuri: medicine)" which is a word to be corrected, by means of the touch panel input. The GUI section 1202 transmits the selected word to the control section 1201.

FIG. 22 shows display contents of the GUI section 1202 in step 1307. In step 1307, a list of alternative words of the word "薬 (kusuri: medicine)" which is designated by the user in step 1306 is displayed. The control section 1201 transmits the word "薬 (kusuri: medicine)" which is designated by the user, to the alternative word selecting section 1209. The alternative word selecting section 1209 refers the word class lexicon 1206 shown in FIG. 15, extracts words of the same class as the word "薬 (kusuri: medicine)" which is designated by the user:

"アスピリン (asupirin: aspirin)"
"かぜ薬 (kazegusuri: cold medicine)"
"トローチ (torochi: troche)"
"胃腸薬 (ichoyaku: medicine for the digestion), and transmits the extracted words to the control section 1201. The control section 1201 transmits the list of alternative words to the GUI section 1202. The GUI section 1202 displays the list of alternative words in a list window 2201.

Figure 23:
FIG. 23 is a view showing display contents of the GUI section 1202 in a process of step 1308.

FIG. 23 shows display contents of the GUI section 1202 in step 1308. In step 1308, a desired word is selected from the alternative word list displayed in the list window 2201. The user performs the touch panel input to click on an alternative word 2301 which is desired by the user, thereby causing the GUI section 1202 to obtain an alternative word "アスピリン (asupirin: aspirin)". The GUI section 1202 transmits the alternative word to the control section 1201.

Figure 24:
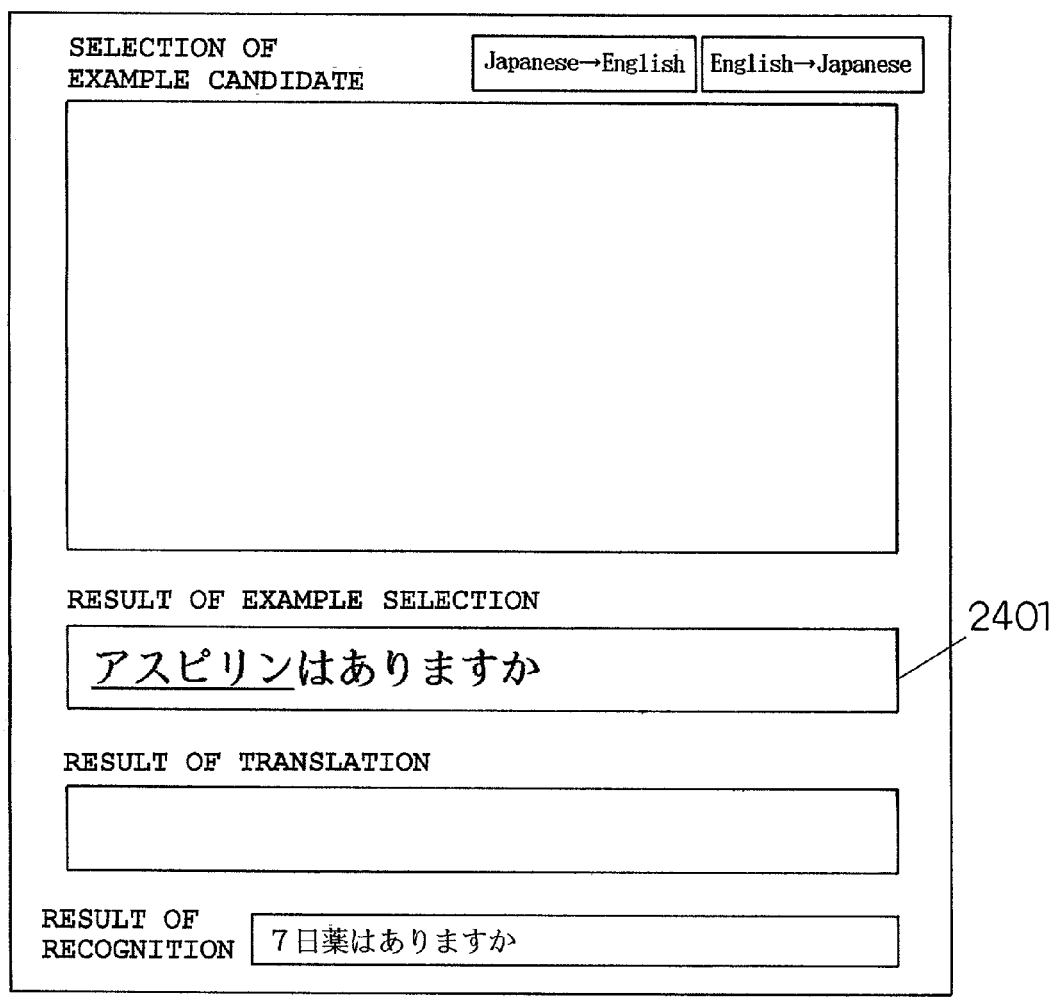
FIG. 24 is a view showing display contents of the GUI section 1202 in a process of step 1309.

FIG. 24 shows display contents of the GUI section 1202 in step 1309. In step 1309, the example is changed by using the designated alternative word "アスピリン (asupirin: aspirin)" to "アスピリンはありますか (Asupirin wa arimasuka: Is there Aspirin?)". Thereafter, the GUI section 1202 changes the example displayed in an example selection result displaying area 2401 to "アスピリンはありますか (Asupirin wa arimasuka: Is there Aspirin?)", and displays the changed example. The control then returns to step 1305.

FIG. 25 shows display contents of the GUI section 1202 in the case where steps 1305 to 1308 are repeated, the user selects the example determination in step 1305, "アスピリンはありますか (Asupirin wa arimasuka: Is there Aspirin?)" is converted into "Any aspirin" of the target language, and synthesized speech is output.

Next, the case of the button input will be described. In the following description, SW1 and SW2 correspond physically to the buttons 806 and 807, respectively.

FIG. 17 shows display contents of the GUI section 1202 in steps 1301 to 1303. In step 1301, translation in the direction of Japanese to English is designated by clicking SW1, and that in the direction of English to Japanese is designated by clicking SW2. In this example, translation in the direction of Japanese to English is designated by clicking SW1. At this time, the GUI section 1202 transmits the direction of translation to the control section 1201, and the control section 1201 instructs the speech inputting section 1203 to perform a speech input. The user pronounces "何か薬はありますか(Nanika kusuri wa arimasuka: Any medicine?)" by using the microphone 803. The speech inputting section 1203 transmits the input speech to the speech recognizing section 1204. In step 1302, the speech recognizing section 1204 performs speech recognition corresponding to the designated direction of translation. It is assumed that a recognition result "七日薬はありますか (Nanoka kusuri wa arimasuka: Seventh day, medicine?)" containing erroneous recognition is transmitted to the control section 1201. The control section 1201 transmits the result of speech recognition to the GUI section 1202 and the example selecting section 1207. The GUI section 1202 displays the transmitted result of speech recognition in the speech recognition result displaying area 1702. By contrast, in step 1303, the example selecting section 1207 searches examples by the method described below on the basis of the result of speech recognition, and transmits the searched examples to the control section 1201. The example selecting section 1207 extracts a set of keywords "七日 (nanoka: seventh day)", "薬 (kusuri: medicine)", and "あり (ari: there is) which are defined in the example database 1205, from the result of speech recognition "七日薬はありますか (Nanoka kusuri wa arimasuka: Seventh day, medicine?)". "七日 (nanoka: seventh day)" belongs to the classified word <日数 (nissu: number of days)>, and "薬 (kusuri: medicine)" belongs to the classified word <薬 (kusuri: medicine)>. "あり (ari: there is) does not belong to any classified word.

The example selecting section 1207 sequentially checks the dependence relationships of the constituent elements shown in FIG. 14, and, from examples in which one or more dependence relationships are established, selects examples in descending order of the number of the established dependence relationships. With respect to the example of example No. 1, for example, "かかり (kakari: it takes)" does not exist in the keyword set. Therefore, the number of the established dependence relationships is 0. With respect to the example of example No. 2, "何か (nanika; any)" does not exist in the keyword set, and hence, in the dependence relationships of the constituent elements, (①→②) does not established but (②→③) is established. Therefore, the number of the established dependence relationships is 1.

When the example selecting section 1207 is designed so as to select an example in which the number of the established dependence relationships is 1 or more, from the example database 1205, the example of example No. 1 in FIG. 14 is not selected, and the example of example No. 2 is selected. "何か (nanika; any)" does not exist in the keyword set. With respect to the selected example of example No. 2, therefore, a display of "薬はありますか (Kusuri wa arimasuka: Is there Medicine?)" is output. In the following description, it is assumed that the other examples "薬ですか (Kusuri desuka: Do you need medicine?)" and "薬です (Kusuri desu: Yes, medicine)" in the example database 1205 are selected in the same manner as described above. The control section 1201 transmits the example sentences sent from the example selecting section 1207 to the GUI section 1202. The GUI section 1202 displays the selected example sentences in the example candidate displaying area 1703.

FIG. 18 shows display contents of the GUI section 1202 in step 1304. In step 1304, from the example candidates displayed in the example candidate displaying area 1604, the user selects the example "薬はありますか (Kusuri wa arimasuka: Is there Medicine?)" which is identical in meaning with the sentence pronounced by the user, by means of the button input. In the selection method, the designated row is moved upward by one line by clicking SW1, and moved downward by one line by clicking SW2. In the case where an example is to be selected, selection can be performed by double-clicking SW1. At this time, the GUI section 1202 transmits the selected example sentence to the control section 1201.

FIG. 19 shows display contents of the GUI-section 1202 in step 1305. In step 1305, the GUI section 1202 displays the selected example sentence in the example selection result displaying area 1901, and clears the example candidate displaying area 1902. Thereafter, it is selected whether the example is determined to be translated, or to be corrected to replace a classified word with a replaceable word. At this time, the user can determine the example by clicking SW2. The determined example is transmitted to the control section 1201. When SW1 is clicked by means of the button input, the control can be transferred to a mode in which a word in the example is replaced. A signal due to the clicking of SW1 is transmitted to the control section 1201.

FIG. 20 shows display contents of the GUI section 1202 in the case where an example is determined in step 1305. In step 1310, the control section 1201 transmits the example "薬はありますか(Kusuri wa arimasuka: Is there Medicine?)" which is determined by the user, to the language converting section 1210. The language converting section 1210 converts the transmitted example into "Any medicine" of the target language by using the example database 1205, and transmits the result of conversion to the control section 1201. The control section 1201 transmits the result of conversion to the GUI section 1202 and the speech synthesizing section 1211. In step 1311, the GUI section 1202 displays the result of conversion in the translation result displaying area 2001. On the other hand, the speech synthesizing section 1211 applies speech synthesis on the result of conversion and then outputs the synthesized speech through the loudspeaker 804.

FIG. 21 shows display contents of the GUI section 1202 in step 1306. In step 1306, the user selects a word which is to be changed in the case where the word selection mode is selected in step 1305. At this time, the control section 1201 instructs the word selecting section 1208 to perform an operation of selecting a word. The word selecting section 1208 extracts the classified word "薬 (kusuri: medicine)" from the example, and then transmits the extracted word to the control section 1201. The control section 1201 transmits the word to the GUI section 1202. The GUI section 1202 underlines "薬 (kusuri: medicine)" which is displayed in the example selection result displaying area 2101 to indicate the user that the word is a replaceable word. The user selects the word "薬 (kusuri: medicine)" which is a word to be corrected, by means of the button input. Specifically, the cursor is leftward shifted by one word by clicking SW1, and rightward shifted by one word by clicking SW2. The word to be corrected can be selected by double-clicking SW1. The GUI section 1202 transmits the selected word to the control section 1201.

FIG. 22 shows display contents of the GUI section 1202 in step 1307. In step 1307, a list of alternative words of the word "薬 (kusuri: medicine)" which is designated by the user in step 1306 is displayed. The control section 1201 transmits the word "薬 (kusuri: medicine)" which is designated by the user, to the alternative word selecting section 1209. The alternative word selecting section 1209 refers the word class lexicon 1206 shown in FIG. 15, extracts words of the same class as the word "薬 (kusuri: medicine)" which is designated by the user:

"アスピリン (asupirin: aspirin)"
"かぜ薬 (kazegusuri: cold medicine)"
"トローチ (torochi: troche)"
"胃腸薬 (ichoyaku: medicine for the digestion), and transmits the extracted words to the control section 1201. The control section 1201 transmits the list of alternative words to the GUI section 1202. The GUI section 1202 displays the list of alternative words in the list window 2201.

FIG. 23 shows display contents of the GUI section 1202 in step 1308. In step 1308, a desired word is selected from the alternative word list displayed in the list window 2201. At this time, as a result of the button input by the user, the GUI section 1202 obtains an alternative word "アスピリン (asupirin: aspirin)", and transmits the selected word to the control section 1201. The input is performed in the following manner. The cursor is moved by clicking SW1 to the word which is immediately above the present word, and is moved by clicking SW2 to the word which is immediately below the present word. In the case where a word is to be selected, selection can be performed by double-clicking SW1.

FIG. 24 shows display contents of the GUI section 1202 in step 1309. In step 1309, the example is changed by using the designated alternative word "アスピリン (asupirin: aspirin)" to "アスピリンはありますか (Asupirin wa arimasuka: Is there Aspirin?)". Thereafter, the GUI section 1202 changes the example displayed in the example selection result displaying area 2401 to "アスピリンはありますか (Asupirin wa arimasuka: Is there Aspirin?)", and displays the changed example. The control then returns to step 1305.

FIG. 25 shows display contents of the GUI section 1202 in the case where steps 1305 to 1308 are repeated, the user selects the example determination in step 1305, "アスピリンはありますか (Asupirin wa arimasuka: Is there Aspirin?)" is converted into "Any aspirin" of the target language, and synthesized speech is output.

In the above description, the manner of performing an input operation on the GUI section 1202 by the user is restricted to the touch panel input and the button input. Alternatively, the selection and determination of a word and an example may be performed by means of speech by using a speech recognition process. The device may be operated by combinedly using various input modalities of a touch panel, buttons, and speech. In the above, translation of Japanese and English has been described as an example. The invention can be similarly applied also to other languages such as Chinese, and does not depend on the language.

In the embodiment, each of the word strings in the invention has been exemplarily described as a sentence configured by plural words. The invention is not restricted to this. For example, each word string may be configured by a one word as in the case of "こんにちは (konnichiwa: Hello).

In the embodiment, the case where the first and second extracting/displaying means in the invention are realized by the single display device has been described. The invention is not restricted to this. For example, the first and second extracting/displaying means may be realized by independent display devices, respectively.

As described above, a speech interpreting device which is an example of the invention is a speech interpreting device which selects an example and performs translation based on an input of speech, wherein hardware of the speech interpreting device is configured by: a computation controlling device which comprises a speech inputting/outputting device as a speech modality, an image outputting device as an image modality, and one or more buttons and an image instructing device as contact modalities, and which converts phonetically and linguistically data of the source language that are input by the user through the speech inputting/outputting device, the image instructing device, and the buttons, into data of the target language, and which supplies the converted data to the speech inputting/outputting device and the image outputting device; an external large-scale nonvolatile memory device which holds programs for instructing the computation controlling device on a procedure of the process, and data; a external data input/output terminal for exchanging the programs and the data between the computation controlling device and an external apparatus; and a power source device which supplies an electric power required for driving the computation controlling device.

In another example, the speech interpreting device is characterized in that a PC/AT compatible motherboard is used in the computation controlling device.

In a further example, the speech interpreting device is characterized in that a hard disk drive of 2.5 inches or smaller is used as the external large-scale nonvolatile memory device.

In a still further example, the speech interpreting device is characterized in that a flash memory disk is used as the external large-scale nonvolatile memory device.

In a still further example, the speech interpreting device is characterized in that a liquid crystal display device which has a vertical resolution of 240 dots or more and a lateral resolution of 240 dots or more is used as the image outputting device.

In a still further example, the speech interpreting device is characterized in that two mechanical buttons are used as the buttons, and functionally correspond respectively to mouse buttons in a case where a mouse is connected to the motherboard.

In a still further example, the speech interpreting device is characterized in that a touch panel the size of which is equivalent to a display screen of the liquid crystal display device, or embraces the display screen is used as the image instructing device.

In a still further example, the speech interpreting device is characterized in that, among input/output terminals of the motherboard, an analog display output terminal, a local area network terminal, and a keyboard terminal are used as the external data input/output terminal.

In a still further example, the speech interpreting device is characterized in that the speech inputting/outputting device is configured by: a USB audio interface which receives and supplies analog audio data and digital audio data through a USB connector of the motherboard; a microphone which collects speech of the user and supplies the speech to the USB audio interface; an audio amplifier which amplifies an output of the USB audio interface; and a loudspeaker which is connected to the audio amplifier.

In a still further example, the speech interpreting device is characterized in that the speech inputting/outputting device is configured by: an audio interface of the motherboard; a microphone which collects speech of the user and supplies the speech to the audio interface; an audio amplifier which amplifies an output of the audio interface; and a loudspeaker which is connected to the audio amplifier.

In a still further example, the speech interpreting device is characterized in that the power source device is configured by a lithium-ion secondary battery.

In a still further example, the speech interpreting device is characterized in that the device is designed so that it can be held by user with one hand, the buttons can be easily operated by the thumb of the one hand, the image instructing device can be easily operated by the other hand, and the direction of a normal of the display screen of the image display device and that of the directionality of the speech inputting/outputting device are easily oriented to the face of the user.

In a still further example, the speech interpreting device is characterized in that the device is configured by a main case on which the buttons, the image instructing device, and the image display device are mounted, and a sub case on which the speech inputting/outputting device is mounted, a display screen of the image display device is covered by the sub case to protect the display screen when the speech interpreting device is not used, and the speech interpreting device is used after the sub case is moved to a predetermined position where the direction of the directionality of the speech inputting/outputting device is oriented to the face of the user.

An example of the invention is a speech interpreting device in which one of examples is selected on the basis of a speech input and translation is then performed, wherein software of the speech interpreting device is configured by: a GUI section which performs input and output operations with respect to the user; a source-language inputting section which receives speech and performs speech recognition on the speech; a translating section which translates the source language input to the source-language inputting section, into a target language; a speech synthesizing section which applies speech synthesis on the target language that is translated by the translating section, and outputs synthesized speech; and a control section which controls the source-language inputting section, the GUI section, the translating section, and the speech synthesizing section.

In another example, the speech interpreting device is characterized in that one sentence of conversation is uses as a unit of the examples.

In a further example, the speech interpreting device is characterized in that sentence patterns which are frequently used in traveling conversation are held as the examples.

In a still further example, the speech interpreting device is characterized in that a word in the example is classified together with a related word which is replaceable with the word.

In a still further example, the speech interpreting device is characterized in that the source-language inputting section is configured by: a speech inputting section which performs a speech input in response to an instruction from the control section; and a speech recognizing section which performs continuous speech recognition on speech that is input through the speech inputting section, to convert the speech into a word string.

In a still further example, the speech interpreting device is characterized in that the translating section is configured by: an example database which holds correspondences between examples of the source language and the target language; a word class lexicon which holds class information of words contained in the example database; an example selecting section which selects a corresponding example from the example database on the basis of an input through the source-language inputting section; a word selecting section which selects a word to be corrected, from the example selected by the example selecting section; an alternative word selecting section which selects an alternative word that is replaceable with the word selected by the word selecting section, from the word class lexicon; and a language converting section which performs conversion into the target language by the example database on the basis of a determined example.

In a still further example, the speech interpreting device is characterized in that the GUI section is configured in a displaying section by: a translation direction designating area in which the direction of translation is designated; a speech recognition result displaying area in which a result of speech recognition supplied from the source-language inputting section is displayed; an example candidate displaying area in which examples selected from the example database by the example selecting section are displayed; an example selection result displaying area in which an example designated by the user is displayed; a translation result displaying area in which an example of the target language supplied from the language converting section is output.

In a still further example, the speech interpreting device is characterized in that, in the GUI section, when the user selects an example from the examples displayed in the example candidate displaying area, the user selects the example by a touch panel operation or a button operation.

In a still further example, the speech interpreting device is characterized in that, when one or more correctable words are exhibited to the user, the word selecting section marks the correctable words in the example candidate displaying area of the GUI section.

In a still further example, the speech interpreting device is characterized in that the correctable words are marked by underlining the words, highlighting the words, displaying the words in bold letters, or blinking the words.

In a still further example, the speech interpreting device is characterized in that, in the word selecting section, the user selects a word to be corrected by performing a touch panel operation or a button operation on the GUI section, or by a speech operation due to speech recognition.

In a still further example, the speech interpreting device is characterized in that, when an alternative word is to be selected, the alternative word selecting section obtains a list of alternative candidates by using the word class lexicon, and the list of candidates is displayed in a list-like form by the GUI section.

In a still further example, the speech interpreting device is characterized in that an alternative candidate is selected from the list of alternative candidates by performing a touch panel operation or a button operation on the GUI section, or by a speech operation due to speech recognition.

In a still further example, the speech interpreting device is characterized in that, when a change to an example which is desired by the user is realized, the user determines the example by performing a touch panel operation or a button operation on the GUI section, the determined example is translated to the target language by the language converting section, and synthesized speech of the example is output by the speech synthesizing section.

As apparent from the above description, the small-sized hardware serving as a speech interpreting device can be easily carried in overseas travel. Since the user interface can be simply operated with one hand, the device can be easily used in various scenes such as shopping and a restaurant. After speech is input by using a word typifying a class and an example is decided, moreover, the word can be replaced with a related word in the same class. Therefore, the utility value as a speech interpreting device is not lowered even in the case where a small recognition vocabulary is used.

The invention provides a program for causing a computer to carry out the functions of all or part of the means (or elements, circuits, sections, etc.) of the speech converting device of the invention described above, and the program operates in collaboration with the computer.

The invention also provides a program for causing a computer to carry out the operations in all or part of the steps (or processes, operations, effects, etc.) of the speech converting method of the invention described above, and the program operates in collaboration with the computer.

The invention also provides a medium having a program recorded thereon for causing a computer to carry out all or some of the functions of all or some of the means of the speech converting device of the invention described above, wherein the program readable by the computer is read by the computer and carries out the functions in collaboration with the computer.

The invention further provides a medium having a program recorded thereon for causing a computer to carry out all or some of the operations in all or some of the steps of the speech converting method of the invention described above, wherein the program readable by the computer is read by the computer and carries out the operations in collaboration with the computer.

Here, part of the means (or devices, elements, circuits, sections, etc.) of the invention and part of the steps (or processes, operations, effects, etc.) of the invention refer to some of the plurality of means or steps, or some of the functions or operations in one of the means or steps.

Further, some of the devices (or elements, circuits, sections, etc.) of the invention refer to some of the plurality of devices, or some of the means (or elements, circuits, sections, etc.) in one of the devices, or some of the functions in one of the means.

In one utilization mode of the program of the invention, the program is recorded on a recording medium readable by a computer, and is operated in collaboration with the computer.

In another utilization mode of the program of the invention, the program is transmitted through a transmission medium, is read by a computer, and is operated in collaboration with the computer.

The recording medium includes a ROM or the like, and the transmission medium includes a transmission medium such as the Internet, light waves, radio waves, or sound waves.

The computer of the invention described above is not limited to pure hardware such as a CPU, but may include firmware, an OS, or even a peripheral device.

The configuration of the invention may be implemented in software or in hardware.

As apparent from the above description, the invention can attain advantages that the device can be further miniaturized as compared with a conventional device, and that the device can be easily operated.

What is claimed is:

1. A speech converting device comprising:
    speech inputting means of inputting speech of one sentence including plural words of a first language;
    speech recognizing means of recognizing said input speech;
    first extracting/displaying means of extracting and displaying examples which are one or plural word strings of said first language, said examples corresponding to a result of said speech recognition and based on a correspondence between said examples and a second language;
    conversion object selecting means of, from said displayed examples, selecting one of said examples which is expected to become an object of conversion to said second language;
    screen display specifying means of specifying at least a part of said selected example by manually highlighting said at least said part of said selected example;
    second extracting/displaying means of, when said at least said part of said selected example is specified, extracting and displaying candidates of a class from a database free of a speech input which corresponds to contents of said specified at least said part of said selected example;
    candidate selecting means of selecting words of the same class out of said displayed candidates; and
    converting means of determining said object of conversion to said second language on the basis of said selected example and said selected words of the same class, and of converting said determined conversion object to a speech language of said second language.

2. A speech converting device according to claim 1, wherein said first extracting/displaying means includes a displaying section comprising a display screen which displays said examples that are objects of said selection by said conversion object selecting means, and said selected example in respective predetermined regions, and
    said second extracting/displaying means overlapingly displays said candidates of said class in a partial region of said display screen in a window form.

3. A speech converting device according to claim 2, wherein, when said selected example is displayed on said display screen, said first extracting/displaying means additionally displays information indicating that the candidates of the corresponding class can be displayed, with respect to said at least said part of said example.

4. A speech converting device according to claim 1, wherein said converting means determines a result in which said specified at least said part of said example is replaced with at least one of said selected words of the same class of said selected candidate, as said conversion object.

5. A speech converting method comprising:
    a speech inputting step of inputting speech of one sentence including plural words of a first language;
    a speech recognizing step of recognizing said input speech;
    a first extracting/displaying step of extracting and displaying examples which are one or plural word strings of said first language, said examples corresponding to a result of said speech recognition and based on a correspondence between said examples and a second language;
    a conversion object selecting step of, from said displayed examples, selecting one of said examples which is expected to become an object of conversion to said second language;
    a specifying step of specifying at least a part of said selected example by manually highlighting said at least said part of said selected example;
    a second extracting/displaying step of, when said at least said part of said selected example is specified, extracting and displaying candidates of a class from a database free of a speech input which corresponds to contents of said specified at least said a part of said selected example;
    a candidate selecting step of selecting words of the same class out of said displayed candidates; and
    a converting step of determining said object of conversion to said second language on the basis of said selected example and said selected words of the same class, and of converting said determined conversion object to a speech language of said second language.

6. A program embodied on a computer readable medium for causing a computer to function as a whole or a part of said speech recognizing means, said first extracting/displaying means, said conversion object selecting means, said screen display specifying means, said second extracting/displaying means, said candidate selecting means, and said converting means of said speech converting device according to any one of claims 1 to 3 or 4.

7. A program embodied on a computer readable medium for causing a computer to function as a whole or a part of said speech recognizing step, said first extracting/displaying step, said conversion object selecting step, said specifying step, said second extracting/displaying step, said candidate selecting step, and said converting step of said speech converting method according to claim 5.

* * * * *